United States Patent
Ma et al.

(10) Patent No.: US 12,348,623 B2
(45) Date of Patent: Jul. 1, 2025

(54) ORCHESTRATED QUANTUM KEY DISTRIBUTION

(71) Applicant: ABN AMRO Bank N.V., Amsterdam (NL)

(72) Inventors: Daphne Ma, Amsterdam (NL); Dimitri Valerie Van Esch, Amsterdam (NL); Johannes Adrianus Hendrikus Röling, Amsterdam (NL)

(73) Assignee: ABN AMRO BANK N.V., Amsterdam (NL)

( * ) Notice: Subject to any disclaimer, the term of this patent is extended or adjusted under 35 U.S.C. 154(b) by 199 days.

(21) Appl. No.: 18/256,996

(22) PCT Filed: Dec. 10, 2021

(86) PCT No.: PCT/EP2021/085328
§ 371 (c)(1),
(2) Date: Jun. 12, 2023

(87) PCT Pub. No.: WO2022/123068
PCT Pub. Date: Jun. 16, 2022

(65) Prior Publication Data
US 2024/0097892 A1  Mar. 21, 2024

(30) Foreign Application Priority Data
Dec. 10, 2020  (NL) .................................. 2027091

(51) Int. Cl.
*H04L 9/08* (2006.01)
(52) U.S. Cl.
CPC .................. *H04L 9/0855* (2013.01)
(58) Field of Classification Search
CPC .................................................. H04L 9/0855
See application file for complete search history.

(56) References Cited

U.S. PATENT DOCUMENTS 9,680,642 B2 *  6/2017  Yeh .................. H04L 9/0855
10,305,873 B2 *  5/2019  Fu .................... H04L 63/062
(Continued)

FOREIGN PATENT DOCUMENTS

EP  3528429 A1  8/2019

OTHER PUBLICATIONS

International Search Report and Written Opinion in corresponding International application No. PCT/EP2021/085328 dated Mar. 21, 2022.

*Primary Examiner* — Viral S Lakhia
(74) *Attorney, Agent, or Firm* — Steven M. Kochler; Westman, Champlin & Koehler, P.A.

(57) ABSTRACT

Key distribution comprises authenticating and registering locations of first and second terminals to a quantum identify provider (QIP); and a quantum location service provider (QLSP); determining security consensus between the first and second terminal and the QIP that identifies a first and second quantum key service provider (QKSP); executing a first key generation process for generating first and second system master keys that are determined based on first and second key parts from the first and second QKSP from first and second key generators that include one or more quantum generators; determining a shared security consensus between the first and second terminal that identifies a third and fourth QKSP; and, executing a second generation process for generating an end-user master for first and second terminal respectively based on third and fourth key parts from the third and fourth QKSP from third and fourth key generators that include one or more quantum key generators.

19 Claims, 19 Drawing Sheets

(56) References Cited

U.S. PATENT DOCUMENTS

| | | | |
|---|---|---|---|
| 10,560,265 B2* | 2/2020 | Zhao | H04L 63/083 |
| 10,574,416 B2* | 2/2020 | Ahn | H04W 52/32 |
| 11,411,722 B2* | 8/2022 | Walenta | H04L 9/0894 |
| 11,424,918 B2* | 8/2022 | Hay | H04L 9/14 |
| 11,469,888 B2* | 10/2022 | McCandlish | G06F 21/86 |
| 11,595,196 B2* | 2/2023 | Li | H04L 9/12 |
| 11,683,165 B2* | 6/2023 | Rahman | H04L 9/085 380/278 |
| 12,028,450 B2* | 7/2024 | Su | H04L 9/08 |
| 2005/0286723 A1 | 12/2005 | Vig et al. | |
| 2013/0083926 A1* | 4/2013 | Hughes | H04L 9/3247 380/278 |
| 2016/0248581 A1 | 8/2016 | Fu et al. | |
| 2019/0260581 A1 | 8/2019 | Su et al. | |

* cited by examiner

ORCHESTRATED QUANTUM KEY DISTRIBUTION

CROSS-REFERENCE TO RELATED APPLICATION(S)

The present application is a § 371 national phase entry of International patent application Serial No, PCT/EP2021/085328, filed Dec. 10, 2021, and published in English, and claims priority from Netherlands application no, 2027091 filed on Dec. 10, 2020.

FIELD OF THE INVENTION

The invention relates to orchestrated distribution of quantum keys, and, in particular, though not exclusively, to methods and systems for orchestrated quantum key distribution, a quantum identity provider and a quantum location service provider for orchestrated quantum key distribution and a computer program product using such methods.

BACKGROUND OF THE INVENTION

High-secure key exchange based on the Public Key Infrastructure (PKI) does not always offer sufficient security. Therefore, ultra-high secure communications systems, that are for example used in high security finance applications, still rely on a manual trusted courier process that is periodically executed to transfer symmetric keys to terminals (the end applications) of the communication system.

Quantum Key Distribution (QKD) may be a first step towards the creation of an absolutely secure quantum network. Such network would be absolutely secure in the sense that it is impossible to intercept data sent over communication channels of such quantum network, since attempted eavesdropping would terminate the connection and no data would be transferred to the eavesdropper. However, hardware components of state-of-the-art QKD systems still have substantial limitations that need to be overcome before such an absolute secure QKD system can be implemented.

For example, optical quantum sources need to be improved to enable an increase in the number of qubits that can be generated. Similarly, quantum detectors need to be improved to increase the capacity/link budgets of quantum channels that should be set up between the terminals. Optical fibres need to be improved to increase the distance at which QKD systems function properly. Telescopes and satellite dishes need to be improved to increase the link budgets and availability of space based QKD. Further, depending on the QKD protocol that is used, keys may need to be stored in a memory of the QKD system which is which is not allowed for high security finance applications.

Implementing a large scale, full end-to-end QKD infrastructure however is problematic as currently practical fibre based QKD systems only work over limited distances. Extending distances, one has to relay the information via classical communication channels. US2016248581 describes an example of a quantum key distribution system including a plurality of routing devices configured to relay keys and a quantum key distribution device connected with the routing devices and configured to use two or more different paths to perform corresponding quantum key negotiations with another quantum key distribution device to obtain shared keys. The two or more different paths each include one or more of the routing devices. The problem of this QKD system is that although the system addresses a problem related to the relay of quantum key through a network, it does not recognize that quantum key resources are scarce and may not always be available on request.

Hence, from the above it follows that there is a need in the art for improved QKD systems that eliminate or at least substantially reduce problems known in the prior art. In particular, there is a need in the art for orchestration of distribution of quantum keys in a hybrid key distribution system comprising both quantum and classical key generating network nodes.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can comprise, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions It is an objective of the invention to reduce or eliminate at least one of the drawbacks known in the prior art.

In a first aspect, the invention may relate to method for orchestrated quantum key distribution comprising:
  authenticating a first and second terminal to a quantum identify provider (QIP) to receive first session tokens for the first and second terminal and registering locations of the first and second terminal to a quantum location service provider (QLSP) based on validating the first session tokens by the QIP;
  determining a first and second security consensus between the first and second terminal and the QIP respectively and determining a shared security consensus between the first and second terminal based on the first and second security consensus;
  executing a first key generation process, by the first and second terminal, using at least a first and second quantum key service provider (QKSP) for generating a first system master key and second system master key for the first and second terminal respectively, the first key generation process including the first QKSP requesting one or more first key parts from one or more first key generators; and,
  executing a second key generation process, by the first and second terminal, using at least a third and fourth QKSP for generating an end-user master key for first terminal and second terminal respectively, the second key generation process including the third QKSP and the fourth QKSP requesting one or more key parts from one or more key generators.

In an embodiment, the executing a first key generation process may further comprise:
  transmitting, by the first terminal, a first key request for a first partial master key to the first QKSP, the first key request including first key information for informing the first QKSP how the first partial master key should be determined on the basis of a plurality of first key parts;
  determining, by the first QKSP, if the plurality of first key parts are available in a first buffer of the first QKSP and if the plurality of first key parts are not available, the first QKSP requesting the one or more first key parts from one or more first key generators; and,
  determining, by the first QKSP, the first partial master key based on the plurality of first key parts, and transmitting the first partial master key to the first terminal.

In an embodiment, if the first plurality of key parts are available in the first buffer and, optionally, if the first key information allows the determination of the first partial master key on the basis of a plurality of first key parts stored in the buffer, determining, by the first QKSP, the first partial master key based on the plurality of first key parts stored in the buffer, and transmitting the first partial master key to the first terminal;
  the first QKSP removing the plurality of first key parts from the buffer and requesting one or more first key parts from one or more first key generators to refill the buffer.

In an embodiment, the one or more first key generators may include at least one quantum key generator.

In an embodiment, executing a first key generation process may further comprise:
  transmitting, by the first terminal, a second key request for a second partial master key to the second QKSP, the second key request including second key information for informing the second QKSP how the first partial master key should be determined on the basis of a plurality of first key parts;

determining, by the second QKSP, if the plurality of second key parts are available in a second buffer of the second QKSP and if the plurality of second key parts are not available, the second QKSP requesting the one or more second key parts from one or more second key generators; and, determining, by the second QKSP, the second partial master key based on the plurality of second key parts, and transmitting the second partial master key to the first terminal.

Hence, the invention relates to a protocol for orchestrated key distribution including keys that are generated by different quantum key generators. The protocol may be used to overcome current QKD limitations and to enable a hybrid key distribution system that both includes generation of keys by quantum systems, e.g. qubits and classical systems, e.g, encryption algorithms. The protocol may be used in a new (key exchange) network for distributing symmetric keys between terminals that need to set up a secure communication channel. As shown by the embodiments in this application, the key distribution protocol includes key generation based on a secure quantum (key exchange) network, may include: key renewals within cycles, different security levels and consensus parameters and multi-step-authentication.

More specifically, key orchestration protocol is configured to orchestrate the generation of so-called key parts that are to be combined to form a symmetric key that can be used for encrypting data during communication between two terminals in a network. The protocol ensures that each network node that participates in the generation of new master keys for terminals will only have a part of the whole key in memory or storage. A set of special network nodes are used to manage and orchestrate the generation and transportation of key parts, including key parts that are generated by a quantum key generator. Only the end-terminals will have access to complete master keys that are used to set up a secure communication channel. This way, it will be difficult gain unauthorized access to complete keys, as the complete keys are only known at the end user. Authentication keys, referred to as QIP authentication keys, may be shared between terminals and a centralized Quantum Identity Provider (QIP). The QIP is a central network element which is part of the core of the key distribution system and which manages the identities of the terminals and ensures proper authentication.

The key orchestration protocol may include multiple key generation cycles for increased security, wherein in each cycle new keys are generated. These newly generated keys are then used in the next cycle. The key generation cycles ensure that a compromised key is limited to one compromised cycle. Intercepting traffic and deriving a key based on intercepted traffic will be useless as cycles may be very short and those keys can never be used again.

Additionally, the key orchestration protocol ensures that so-called key parts, that are used to determine one or more master keys that reside with the terminals, are generated by multiple key generators, including quantum key generators QKGs. Each generator will only generate a part of one master key. The key parts may be generated by different QKGs and managed by different Quantum Key Service Providers (QKSPs). The protocol may require that a master key may only be constructed based on key parts from different QKSPs. The protocol may further require that only terminals and the QIP may have access to and/or store a complete key (a master key) in its memory, while the other network nodes/elements in the system only have access to key parts.

In a further embodiment, the method may further comprise: authenticating the first and second terminal to the QIP based on a first and second authentication key respectively, the first and second authentication keys being derived from the first master key and a key derivation scheme known from the shared consensus and generate second session tokens for the first and second terminal respectively; receiving locations of the first and second terminal form the QLSP based on the second session tokens, authenticating the first and second terminal with each other based on a direct authentication key DAK, the DAK being generated by the first and second terminal based on the second master key and a key derivation scheme known from the shared consensus; establishing a secure channel and exchange data over the secure channel based on a direct encryption key DEK until one of the security thresholds of the shared security context is reached, the DEK being generated based on the second master key and a key derivation scheme known from the shared security context; and, executing a further first key generation process and further second key generation process with at least two QKSPs, if more data exchange over the secure communication channel is needed, the further first and second key generation process being used to determine a further first master key and a further second master key, the key generation processes including the first and second QKSP requesting one or more key parts from one or more quantum key generators.

In an embodiment, the first system master key and second system master key may be used by the first and second terminal respectively to start the execution of the second key generation process.

In an embodiment, the first security consensus, the second security consensus and/or the shared security consensus may include consensus information comprising at least one of:

information on the (minimum) key length of a partial master key that the first and/or second QKSP constructs based on key parts, the number of key parts that the first and/or second QKSP may use for constructing a first and/or second partial master key, a (minimum) length of a key part generated by a key generator, the (minimum) number of quantum key generators, the (minimum) number of new (non-buffered) key parts that is used to construct a partial master key, information whether or not a partial master key may be determined based on key parts that are stored in the buffer of a QKSP, information, e.g. one or more identifiers, associated with one or more key derivation protocols that may be used by a terminal to derive different keys from a master key, information, e.g, one or more identifiers, associated with one or more authentication protocols that may be used for authenticating terminals with each other and/or with other network elements such as the QIP, QKSP or QLSP, information about the protocols and/or algorithms that are used by the QIP to authenticate, sign and/or validate terminals or requests of terminals, threshold information for determining when a secure communication channel (one communication cycle) has ended. Such threshold information may include e.g. maximum amount of data traffic, number of messages and/or transactions per cycle and/or maximum time/duration per cycle.

The key orchestration protocol requires terminals and the QIP to reach consensus on the security levels of the keys. This consensus will determine the security parameters for each key that will be generated in each cycle. Consensus parameters may include:

*all numbers are examples of what they could be*
minimum key length: 256 bits
maximum error rate: 10^-6
key parts: 7
number of Key Service Providers: 2
number of key generators: 7
minimum key length Quantum generated keys: 64 bits
minimum number of Quantum Key Generators: 5
minimum number of new/non-buffered key parts: 3
allow buffered keyparts: yes/no
key derivation protocol: xxx
direct authentication protocol: yyy
qip signing protocol/method/mechanism
maximum amount of traffic per cycle: 1024 KB
maximum number of messages/transactions per cycle: 64
TTL of each cyclus (maximum time/duration of each cycle): 300 seconds Based on the consensus, different variants of the key distribution system can be created, each with specific security levels and options. The list of parameters above is just an example how a security context of the key distribution system can be created/agreed upon.

In a further aspect, the invention may relate to a system for orchestrated quantum key distribution comprising;
  a quantum identity provider (QIP);
  a quantum location service provider (QLSP);
  at least two different quantum key service providers (QKSP); and,
  a computer readable storage medium having computer readable program code embodied therewith, and at least one processor, preferably a microprocessor, coupled to the computer readable storage medium, wherein responsive to executing the computer readable program code, the at least one processor is configured to perform executable operations comprising:
  authenticating a first and second terminal to a quantum identify provider (QIP) to receive first session tokens for the first and second terminal and registering locations of the first and second terminal to a quantum location service provider (QLSP) based on validating the first session tokens by the QIP;
  determining a first and second security consensus between the first and second terminal and the QIP respectively and determining a shared security consensus between the first and second terminal based on the first and second security consensus;
  executing a first key generation process, by the first and second terminal, using at least a first and second quantum key service provider (QKSP) for generating a first system master key and second system master key for the first and second terminal respectively, the first key generation process including the first QKSP requesting one or more first key parts from one or more first key generators; and,
  executing a second key generation process, by the first and second terminal, using at least a third and fourth QKSP for generating an end-user master key for first terminal and second terminal respectively, the second key generation process including the third QKSP and the fourth QKSP requesting one or more key parts from one or more key generators.

In an embodiment, the executing a first key generation process may further comprise: transmitting, by the first terminal, a first key request for a first partial master key to the first QKSP, the first key request including first key information for informing the first QKSP how the first partial master key should be determined on the basis of a plurality of first key parts; determining, by the first QKSP, if the plurality of first key parts are available in a first buffer of the first QKSP and if the plurality of first key parts are not available, the first QKSP requesting the one or more first key parts from one or more first key generators; and, determining, by the first QKSP, the first partial master key based on the plurality of first key parts, and transmitting the first partial master key to the first terminal.

In an embodiment, if the first plurality of key parts are available in the first buffer and, optionally, if the first key information allows the determination of the first partial master key on the basis of a plurality of first key parts stored in the buffer, determining, by the first QKSP, the first partial master key based on the plurality of first key parts stored in the buffer, and transmitting the first partial master key to the first terminal; the first QKSP removing the plurality of first key parts from the buffer and requesting one or more first key parts from one or more first key generators to refill the buffer.

In an embodiment, the one or more first key generators include at least one quantum key generator.

In an embodiment, executing a first key generation process may further comprise: transmitting, by the first terminal, a second key request for a second partial master key to the second QKSP, the second key request including second key information for informing the second QKSP how the first partial master key should be determined on the basis of a plurality of first key parts; determining, by the second QKSP, if the plurality of second key parts are available in a second buffer of the second QKSP and if the plurality of second key parts are not available, the second QKSP requesting the one or more second key parts from one or more second key generators; and, determining, by the second QKSP, the second partial master key based on the plurality of second key parts, and transmitting the second partial master key to the first terminal.

In an embodiment, the executable operations may further comprise: authenticating the first and second terminal to the QIP based on a first and second authentication key respectively, the first and second authentication keys being derived from the first master key and a key derivation scheme known from the shared consensus and generate second session tokens for the first and second terminal respectively; receiving locations of the first and second terminal form the QLSP based on the second session tokens, authenticating the first and second terminal with each other based on a direct authentication key DAK, the DAK being generated by the first and second terminal based on the second master key and a key derivation scheme known from the shared consensus; establishing a secure channel and exchange data over the secure channel based on a direct encryption key DEK until one of the security thresholds of the shared security context is reached, the DEK being generated based on the second master key and a key derivation scheme known from the shared security context; executing a further first key generation process and further second key generation process with at least two QKSPs, if more data exchange over the secure communication channel is needed, the further first and second key generation process being used to determine a further first master key and a further second master key, the key generation processes including the first and second QKSP' requesting one or more key parts from one or more quantum key generators.

In an embodiment, the first system master key and second system master key may be used by the first and second terminal respectively to start the execution of the second key generation process.

The key orchestration protocol may be based on a multi-step authentication (MSA) architecture, wherein in a first step for a terminal may authenticate itself to the Quantum Identity Provider (QIP). In turn, the QIP may generate a temporary authorization token that can be used to request a Quantum Location Service Provider (QLSP) to provide a location of the receiving terminal. A second step relates to the authentication of the terminals to each other. In that case, a key may be used that was agreed upon between the terminals at an earlier stage to authenticate to one another. This key is also known as the direct authentication key.

MSA will make it more difficult for an attacker to set up a communication channels with another terminal, as it will need to receive multiple keys in order to do so. If a hacker gets a hold on an authentication key, it will be possible for a hacker to spoof the identity into a part of the system and locate different other terminals. In some embodiments, an authentication key of a terminal may be associated with a counter, which is maintained and managed by the elements that exchange the authentication key, e.g. the terminal and the QIP.

The moment the identity of a terminal is spoofed, and the terminal tries to identify and authenticate itself to the system, the system, in particular the network element that validates an authentication key such as the terminal or the QIP will notice that there's a mismatch in either the key, or the counter associated with the key, resulting in an authentication failure, and the immediate offboarding of the user.

The key orchestration protocol will ensure safe orchestration of the creation of key parts, the delivery of incomplete master keys to the terminal and the formation of a complete master key at the terminal. To ensure a high level of security, at least part of the key parts is generated by a quantum key generator. This way, the system will be resistant to eavesdropper attacks, brute-force quantum attacks, and fully flexible to be able to connect multiple quantum and non-quantum key generators and communication methods.

This way, the key orchestration protocol resolves limitations in existing. Quantum Key Distribution (QKD) systems including problems related to distance limitations for fiber-based QKD, low availability and low link-budgets in free-space QKD, availability of satellite-to-ground QKD communication channels, combining multiple QKD protocols in one system; and, the prohibition of storage of complete keys (master keys) in memory of network elements of the QKD system other than the terminals.

The key orchestration protocol is especially suited for (and compatible with) ent financial transaction systems which may still be based on a manual trusted courier process for master key distribution, and asymmetric keys in end-point devices (terminals) using an automated key exchange protocol. By eliminating the asymmetric keys in end-point devices, the protocol provides a solution to problems related to post-quantum crypto schemes wherein the complexity and the length of the keys will make such schemes not suitable for low-power end-point devices (terminals).

The invention will be further illustrated with reference to the attached drawings, which schematically will show embodiments according to the invention. It will be understood that the invention is not in any way restricted to these specific embodiments.

DETAILED DESCRIPTION

Figure 1:
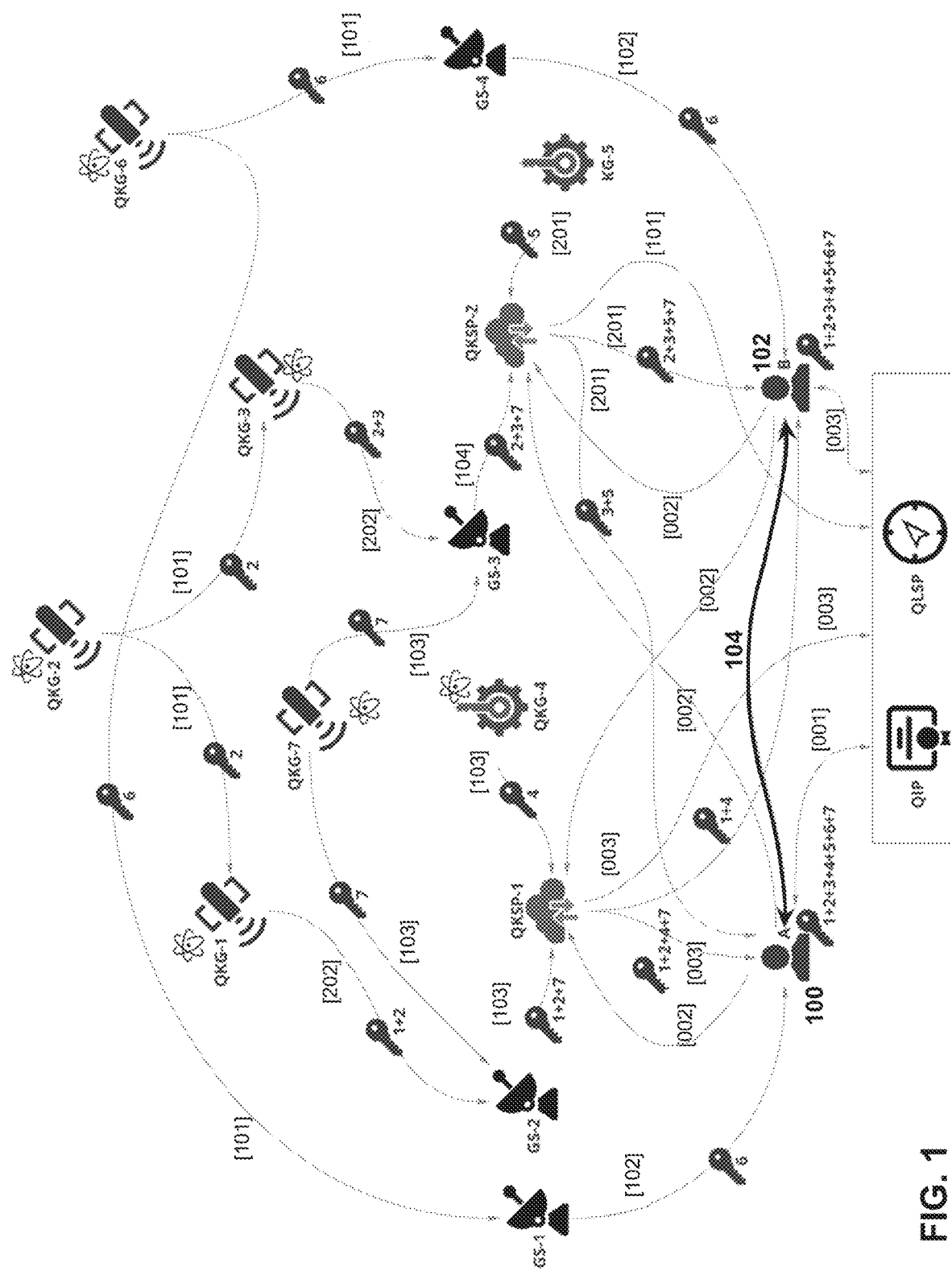
FIG. 1 depicts a key distribution system according to an embodiment of the invention.

FIG. 1 depicts a schema of a system for orchestrated key distribution according to an embodiment of the invention. As shown in the figure, the system may include a first terminal A 100 and second terminal B 102, wherein the terminals define end-point devices that can connect to network nodes of the system. A terminal may be implemented as a computer or a computer system, e.g. a network of computers belonging to a certain organization, e.g. a financial institution, a telecom provider or a governmental organization. A communication channel 104 between terminal A and B may be encrypted based on encryption keys, typically one or more symmetric keys, which need to be distributed to the terminals in a secure way. As will be described hereunder in greater detail, the symmetric key will be generated based on a predetermined number of key parts that are generated by key generators. These key generators may include one or more quantum key generators, e.g. QKG 1-4,6,7, which may be configured to generate quantum keys based on a quantum process. These key generators may further include one or more classical key generators, e.g. KG-5, which may be configured to generate keys based on a classical key generating algorithm. As shown in the figure, the quantum key generators may be implemented as satellite-based, long-distance quantum key distribution QKD systems, such as measurement device independent MDI QKD systems, which may include a free-space communication channel between a satellite and two ground stations (GS 1-4) and a land communication channel between the ground stations and the terminals. The quantum keys may be generated based on known quantum key distribution QKD protocols such as BB84, SARG04, B92, BBM92, etc.

To manage the distribution of the quantum keys to the terminals, the system may include a number of network nodes, including a Quantum Identity Provider (QIP) which is configured to manage the identification and authentication of terminals and the other network elements in the system that participate in the key distribution process. To that end, the system may use Identification Keys (IKs), which may be keys (which may be pre-loaded in the factory) and used for activating, identifying and registering users via the Quantum Identity Provider (QIP) to the system. The system may further include a Quantum Location Service Provider (QLSP) which is configured to manage location information of the terminals, e.g. IP addresses or URLs, and other network nodes in the system. The location information allows network nodes and terminals to communicate with each other. The QIP and the QLSP may form the core of the system for orchestrated key distribution as depicted in FIG. 1.

The network nodes may further include a so-called Quantum Key Service Provider network node (QKSP 1,2), which may function as an intermediary between terminals and the Quantum Key Generators. The QKSP may be configured to collect key parts from key generators. Hence, each QKSP may be connected to a number of key generators, including one or more quantum key generators. Quantum key generators are complex systems and quantum keys are not always readily available upon request by a terminal. To that end, a key buffering scheme between a QKSP and key generators connected to the QKSP may be implemented. A key buffering schedule may be used that periodically or regularly requests the generation of key parts by the key generators, so if a quantum key generator is available for key generation, key parts may be requested by the QKSP and stored in a buffer.

Hence, based on this key buffering scheme, every time key parts are removed from the buffer (e.g. because they are used by the QKSP to construct a partial master key), the buffer will be updated with new key parts from different key generators. This way, key parts may be stored in the buffer so that they are directly available for transmission to a terminal, when the QKSP receives a key request from the terminal. Key parts may be stored in the buffer together with metadata, e.g. information, e.g. a time stamp, about when the key part was generated, information on the identity of the key generator that generated the key part, information on the scheme, e.g. protocol, and/or algorithm that was used to generate the key part, information about the length of the key part, etc.

A QKSP may also be configured to construct a partial master key for a terminal. Such a partial master key may be constructed based on the key parts. A terminal may construct a master key based on two or more partial master keys which are generated by two or more QKSPs. A master key may be used by a terminal to derive keys to set up a secure communication channel between. To that end, a secure protocol may be used to share a key derivation scheme between terminals.

The network nodes in the system may communicate with each other based on different communication channels. For example, secure fiber-based communication channels [001], [002], [003] for key request by terminals and authorization verification of terminals with the QIP, QKD communication channels for requests for key parts, e.g. MDI-QKD free space communication channels [101],[102] and BB84-QKD free space communication channels [103],[104], secure free space fiber optical communication channel for communication of key parts [202] and a secure communication channel between terminals for authentication and data transfer. During execution of the protocols between the terminals, the QIP and the QLSP, different keys may be used to enable access to different network elements of the key distribution system. These keys and the protocols to derive these keys will be described hereunder in more detail.

Figure 2:
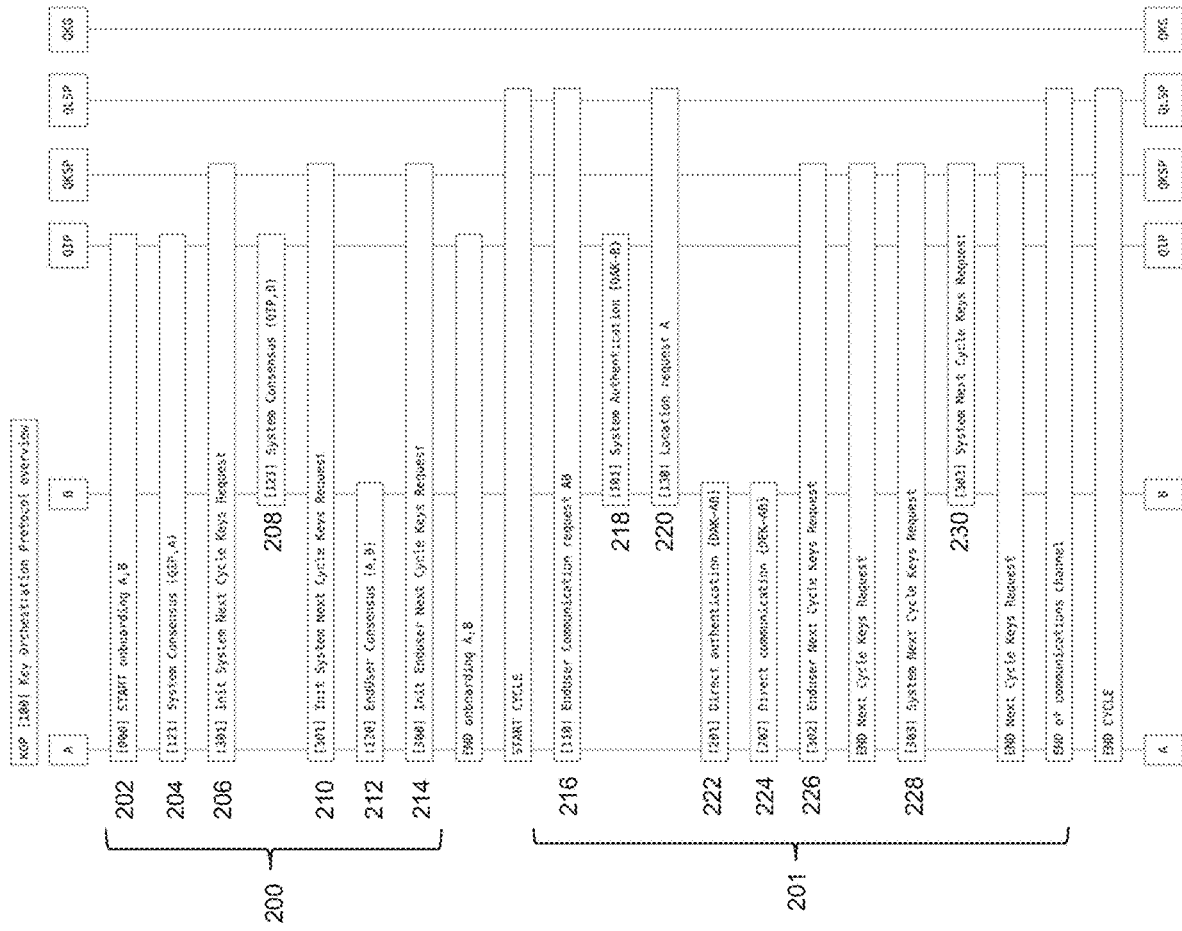
FIG. 2 depicts general protocol flow of an orchestrated key distribution scheme according to an embodiment of the invention.

FIG. 2 depicts a general process flow of a key orchestration protocol according to an embodiment of the invention. The process may generally include two phases, i.e. a first phase 200 wherein terminal A and B execute an onboarding protocol that includes authentication of the terminals to the core network elements (QIP, QKSP, QLSP) and the generation of the master keys that are needed in a second phase, in which a secure channel between terminals is set up.

In a second phase 201 terminal A and B may establish a secure communication channel, exchange data over this communication channel until a certain threshold, e.g. a time period or an amount of transmitted data, has been reached and generate new master keys if further communication over a secure communication channel is needed.

The onboarding protocol process (step 202 of FIG. 2) may include authenticating, and identifying terminal A and B to the QIP based on initialization keys (IKs). The initialization keys that are needed for onboarding may be preloaded with the terminals and the QIP. This may be implemented as a one-time process of loading the keys in the hardware/software of the terminals and the registration of the terminals with the QIP.

Figure 3:
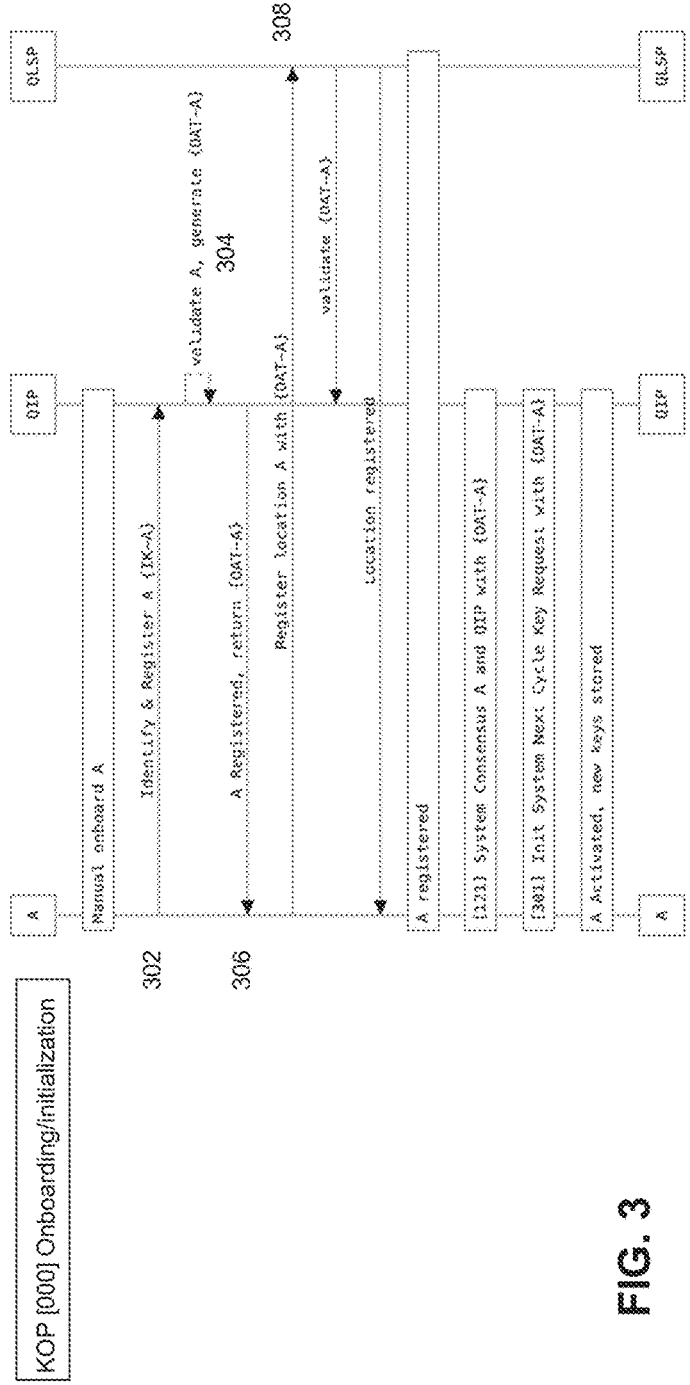
FIG. 3 depicts an onboarding process according to an embodiment of the invention.

An example of the onboarding process is described with reference to FIG. 3. First, terminal A may start an onboard process with the QIP. This process may start with terminal A registering with the QIP based on an Initialization Key IK. If the QIP receives the IK, it may validate the key based on the initialization Key that is stored with the QIP. If validation is successful, the QIP may generate an onboarding authentication token OAT-A for terminal A. The QIP may send a response message back to terminal A including the OAT, so that this token can be used in the further onboarding process. Terminal A may then send its location including the OAT-A to the QLSP to register its location. The QLSP may validate OAT-A with the QIP before registering the location of terminal A. After successful validation of the OAT, the QLSP may send a response message back to terminal A notifying that its location has been successfully registered with the QLSP. Once terminal A has been successfully registered with the QIP and the QLSP, terminal A has been successfully onboarded with the key distribution system. Terminal B may be onboarded using the same process wherein terminal B is provided with onboarding authentication token OAT-B, which is subsequently used to register terminal B with the QLSP.

Once terminal A and B are onboard, the terminals may agree on security parameters that are used within the system. This process may be referred to as the consensus protocol. During the execution of the consensus protocol, terminal A and B agree on a consensus on the security parameters with the QIP. A consensus agreed between a terminal and the QIP may be referred to as a system consensus, which includes requesting a system consensus from the QIP and accepting the system consensus including security parameters returned by the QIP (step 204 of FIG. 2).

Figure 4:
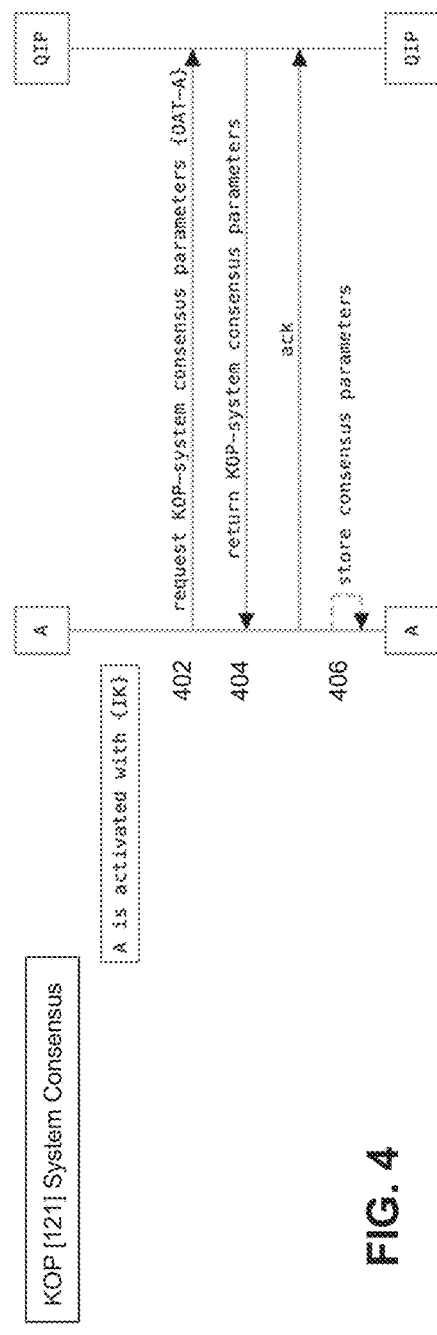
FIG. 4 depict a security consensus process according to an embodiment of the invention.

An exemplary example of the process for obtaining a system consensus is described with reference to FIG. 4. As shown in this figure, terminal A, activated with 1K, may send a request for consensus parameters together with the OAT-A to the QIP, which subsequently sends a response message comprising the consensus parameters to terminal A, which may store the parameters in a secure part of its memory. An example of a set of consensus parameters is provided in the table below:
 ##security-parameter-consensus
 minimum key length: 256 bits
 maximum error rate: $10^6$
 number of key parts to build partial master key: 7
 number of Key Service Providers: 2
 number of key generators: 7
 minimum key length quantum keys: 64 bits
 minimum number of Quantum Key Generators: 5
 minimum number of new/non-buffered key parts: 3
 allow buffered key parts: yes/no
 key derivation protocol: [kdp-ID]
 direct authentication protocol: [dap-ID]
 QIP signing protocol/method/mechanism
 maximum amount of traffic per cycle: 1024 KB
 maximum number of messages/transactions per cycle: 64
 TTL of each cycle (maximum time/duration of each cycle): 300 seconds Hence, the security parameters of a consensus may include information on the (minimum) key length of a partial master key that the QKSP constructs based on the key parts, the number of key parts that a QKSP may use for constructing a partial master key, a (minimum) length of a key part that is generated by a quantum key generator, the (minimum) number of quantum key generators, the (minimum) number of new (non-buffered) key parts that is used to construct a partial master key, information whether or not a partial master key may be determined based on key parts that are stored in the buffer of a QKSP, information, e.g. one or more identifiers, associated with one or more key derivation protocols that may be used by a terminal to derive different keys from a master key, information, e.g. one or more identifiers, associated with one or more authentication protocols that may be used for authenticating terminals with each other and/or with other network elements such as the QIP, QKSP or QLSP, information about the protocols and/or algorithms that are used by the QIP to authenticate, sign and/or validate terminals or requests of terminals, threshold information for determining when a secure communication channel (one communication cycle) has ended. Such threshold information may include e.g. maximum amount of data traffic, number of messages and/or transactions per cycle and/or maximum time/duration per cycle.

Thereafter, terminal A may execute so-called Initial System Next Cycle Key Request protocol with the QKSP (step 206 in FIG. 2). This process may be used to generate so-called system master keys (System Next Cycle Master (S-NCMK) key) for terminal A and B. These system master keys may be used to by terminals to derive authentication keys for QIP when terminal A and B want to set up a secure communication channel. These authentication keys may be derived from system master keys based on a key derivation scheme identified in the system consensus parameters and may be referred to as the QIP Authentication Keys QAKs. An exemplary example of the Initial System Next Cycle Key Request is described with reference to FIGS. 5A and 5B.

As shown in these figures, the process may start with terminal A transmitting a key request for a first partial master key to a first QKSP1. The key request may comprise the OAT-A, which the first QKSP may use to validate the request with the QIP. Further, the key request may include first key information associated with the requested first partial master key. The first key information may relate for example to rules that are used to construct the partial master key. For example, the first key information may include information about the length of the partial master key, the number of key parts that may be used to construct the partial master key, whether the first partial master key should be constructed based on at least one key part that is a quantum key part generated by a quantum key generator and—if so—the type of quantum key generator and/or the type of QKP protocol for generating such quantum key part. Terminal A may derive the first key information based on the system consensus between terminal A and the QIP.

Figure 17:
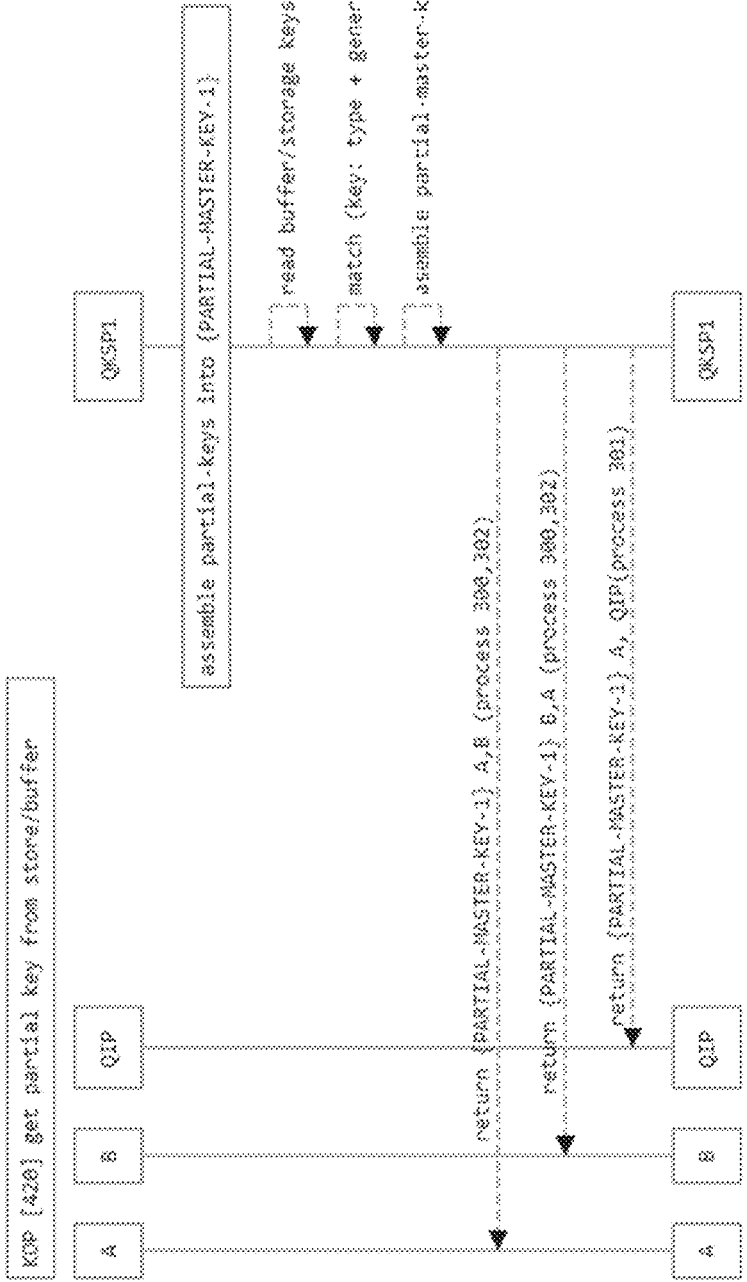
FIG. 17 depicts a request for partial master keys from a buffer according to an embodiment of the invention.

When the first QKSP receives the request, the first QKSP may use the first key information in the key request to check if there are sufficient key parts in the buffer that meet the requirements as specified in the key information. If this is the case, the requested first partial master key will be constructed based on key parts selected from the key parts that are stored in the buffer and transmitted back to terminal A. A more detailed flow diagram of this process is depicted in FIG. 17, showing the steps of determining a partial master key based on key parts stored in the buffer. Key parts generated by different key generators may be stored in the buffer. In an embodiment, the key parts may be stored together with metadata in the buffer. This metadata may include parameters that are similar and/or identical to the first key information in a key request that a terminal may send to the first QKSP. For instance, a key part stored together with metadata in the buffer may look as follows:
 "key": "0010100101001", "method": "bb84", "generator-id": 001, "key-id": 001

This example illustrates a key part and metadata associated with the key part signaling that the key part is a quantum key part that is generated based on the bb84 QKD protocol, generated by quantum key generator 0001 and identified within the buffer based on a key identifier. Single key cannot be extended/appended. If the length of the request key is greater than the length of a single key in buffer, then multiple keys will be appended to a single key with the requested length.

Thus, if the first QKSP receives a key request, it will parse the first key information in order to determine whether the partial master key may be generated solely on the basis of key parts stored in the buffer. If that is the case, the first QKSP may use the first key information to determine if the buffer comprises the key parts that are needed to determine the requested first partial master key. For example, the first key information may require determination of a first partial master key based on two or more key parts wherein at least one of the key parts should be generated by a predetermined quantum key generator and wherein another one of the key parts may be generated by a classical key generator. Based on the first key information and the metadata associated with the key parts stored in the buffer, the first QKSP may determine that the buffer comprises these specific key parts so that it can use these key parts to assemble the requested partial master key and transmit it to terminal A. Thereafter, the first QKSP may remove these keys from its buffer and trigger one or more requests to key generators to refill the buffer with further key parts for further key requests, while the terminals may continue the execute further steps in the key distribution process.

Figure 5A:
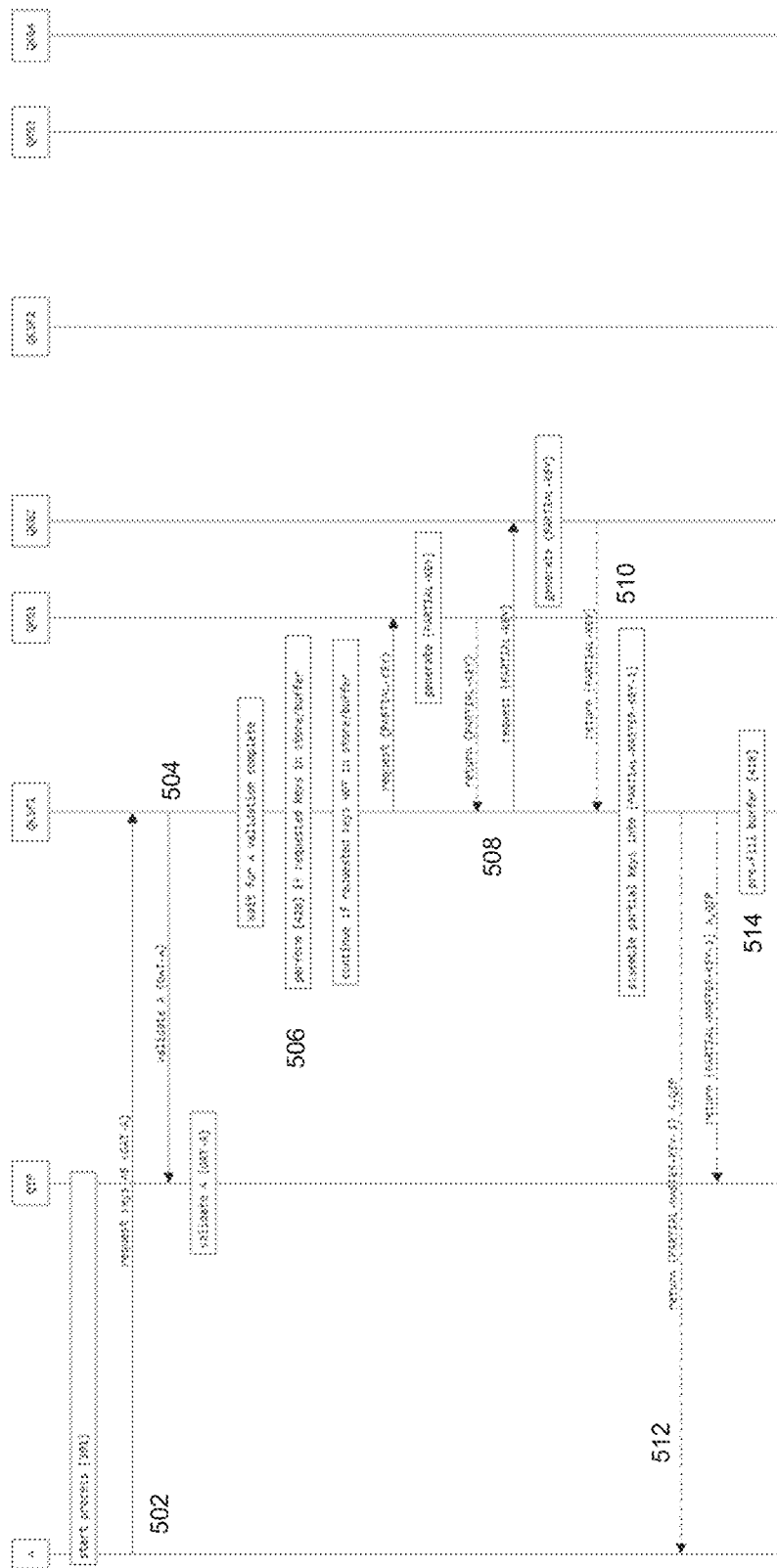
FIGS. 5A and 5B depict an initial system next cycle key request process according to an embodiment of the invention.

Going back to FIG. 5A, if the buffer does not comprise all the key parts that are needed according to the first key information in the request, then the first QKSP may transmit one or more key requests to one or more key generators respectively to generate new, on-demand key parts. If on-demands key parts are not immediately available, then the one or more key request will be scheduled with high priority by the scheduler of the first QKSP to fill the buffer with key parts that are necessary to determine the requested first partial master key for terminal A and QIP as soon as possible.

If quantum key generators are available to generate the key parts requested by the first QKSP, then the first QKSP may send a partial key request to a first key generator QKG1 to request the generation of one or more first key parts. In a further embodiment, if required by the first key information, the first QKSP may send a partial key request to a second key generator QKG2 to generate one or more second key parts. For example, the one or more first key parts may be quantum key parts generated by a quantum key generator, while the one or more second key parts may be classical key parts generated by a classical key generator. Thereafter, the first QKSP may assemble the first partial master key based on (at least part of) the one or more first key parts and/or the one or more second key parts. The first partial master key may be sent to both terminal A and the QIP.

Figure 5B:
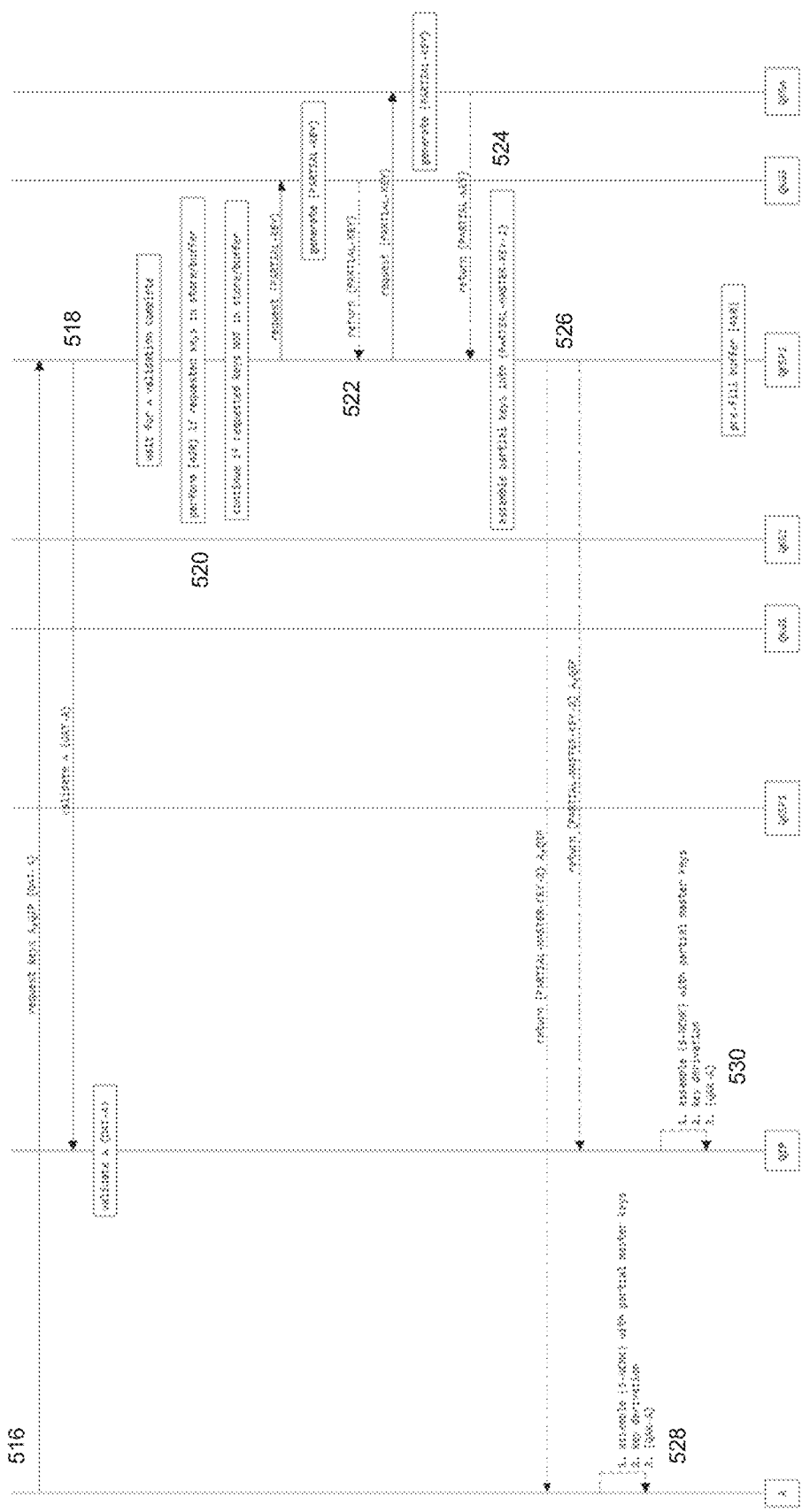

In a similar way, terminal A may send a key request comprising an OAT-A and second key information associated with a requested second partial master key to a second QKSP to generate a second partial master key (FIG. 5B). Once validated by the QIP, the second QKSP may determine a second partial master key in a similar way as described above with reference to the first partial master key. Thus, based on the second key information in the request, the second QKSP may first check if it may determine the second partial master key (solely) based on key parts in the buffer. If this is the case, the second QKSP may check—based on the second key information—if the required key parts are available in the buffer. If this is the case, the second QKSP may determine the second partial master key based on the required key parts and transmit it to terminal A. Additionally, the second QKSP may trigger transmission of one or more key request to one or more key generators, e.g. a third key generator QKG3 and a fourth key generator QKG4, to refill the buffer of the second QKSP.

Alternatively, if all or a part of the required key parts are not available in the buffer, the second QKSP may send one or more key requests to one or more key generators, e.g. quantum key generators and/or classical key generators, to generate the missing key parts on-demand. If on-demands key parts are not immediately available, then the one or more key request will be scheduled with high priority by the scheduler of the second QKSP to fill the buffer with key parts that are necessary to determine the requested second partial master key for terminal B and QIP as soon as possible.

If the key generators are available for on-demand key generation, the second QKSP may transmit one or more key requests to one or more key generators, e.g. a third and a fourth partial key to a third key generator QKG3 and a fourth key generator QKG4 respectively, which may generate the requested key parts and transmit the key parts to the second QKSP. The second QKSP may then construct the second partial master key and send this partial master key to terminal A and the QIP. Both terminal A and the QIP may use the first and second partial master key to determine a first system master key (first System Next Cycle Master Key S-NCMK). The first system master key and a key derivation scheme known from the system consensus parameters may be used determine authentication keys, such as the first QIP authentication key, OAK-A, which may be used by terminal A in the second phase of the key distribution scheme of FIG. 2, which deals with setting up a secure communication channel between terminal A and terminal B.

The consensus protocol and the Init System Next Cycle Keys Request protocol as described above with reference to FIG. 4 and FIGS. 5A and 5B may be repeated for terminal B to provide terminal B and the QIP with a second system master key (second System Next Cycle Master Key S-NCMK) and a second QIP authentication key, OAK-B (steps 208 and 210 of FIG. 2). Note that terminal B may agree on different consensus parameters with the QIP than terminal A.

Figure 6:
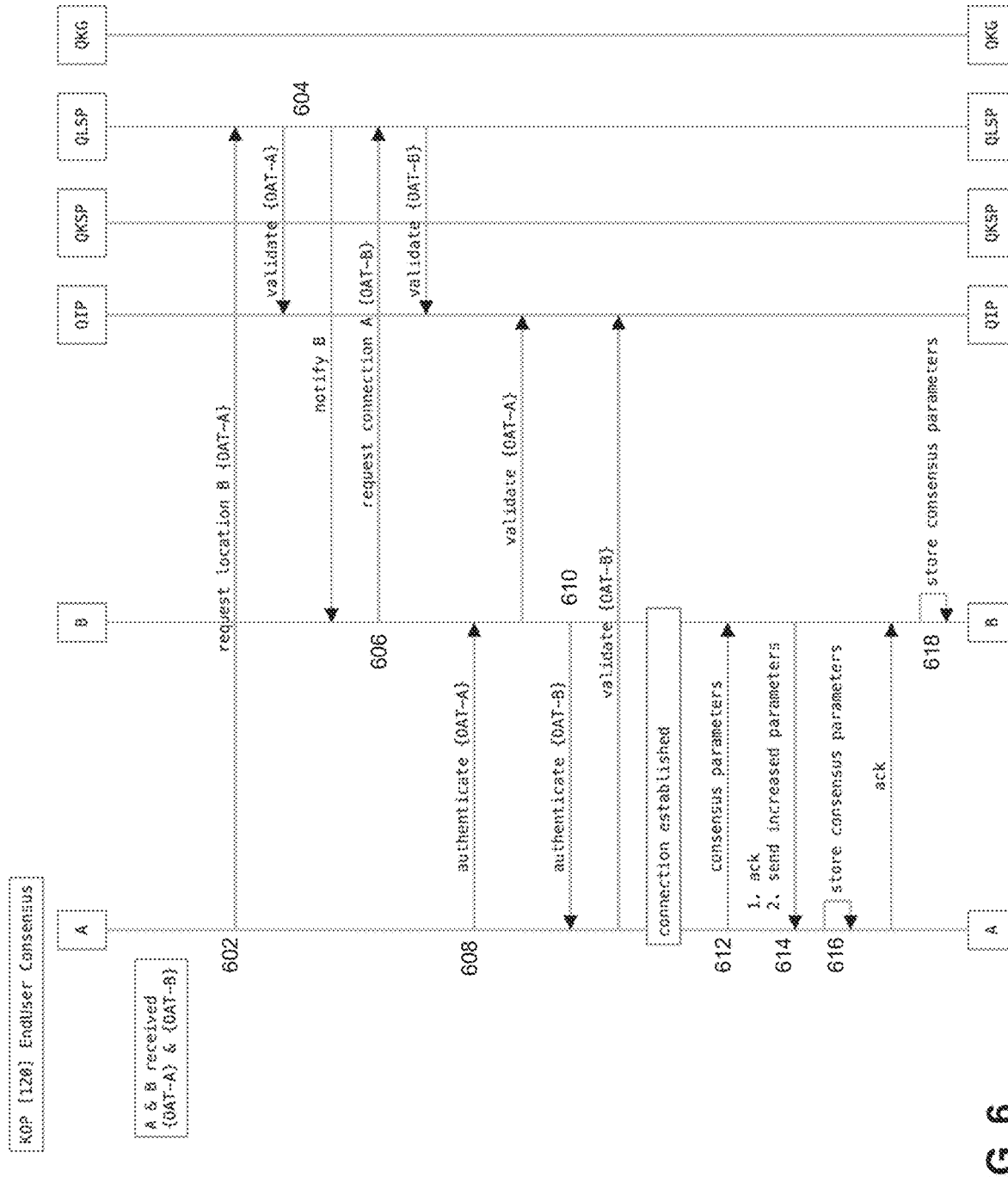
FIG. 6 depicts a security consensus process according to an embodiment of the invention.

Once terminal A and B are provided with system master keys, terminals A and B may further start a consensus protocol between themselves (step 212 in FIG. 2). This process may be different to the consensus process to QIP, in the sense that the consensus process may be executed at a higher security level (but not lower). An exemplary example of the direct consensus protocol is described with reference to FIG. 6. As shown in this figure, the process may start with terminal A sending a location request for terminal B including an OAT-A to the QLSP, which validates the OAT-A with the QIP and may send terminal B a first notification message comprising the location of terminal A. The notification message may inform terminal B that terminal A would like to establish a connection with terminal B. In response, terminal B may send a request to connect to terminal A to the QLSP, comprising OAT-B, which may be validated by the QIP. After this process, terminal A and B know each other's location so that terminal A and B can authenticate each other via the QIP based on OAT-A and OAT-B respectively.

A data connection between terminal A and B may be established which may be used to exchange data or information to reach consensus. Thereafter, terminal A may send its consensus parameters to B and terminal B may acknowledge acceptance of the consensus parameters. In case, one or more of the consensus parameters of terminal B are higher than those of terminal A, terminal B may notify this so that terminal A can modify its consensus parameter accordingly. After the exchange of the consensus parameters terminal A and B may use the same set of consensus parameters for secure data exchange. These consensus parameters may be referred to as shared consensus parameters, or in short, a shared consensus.

Figure 7A:
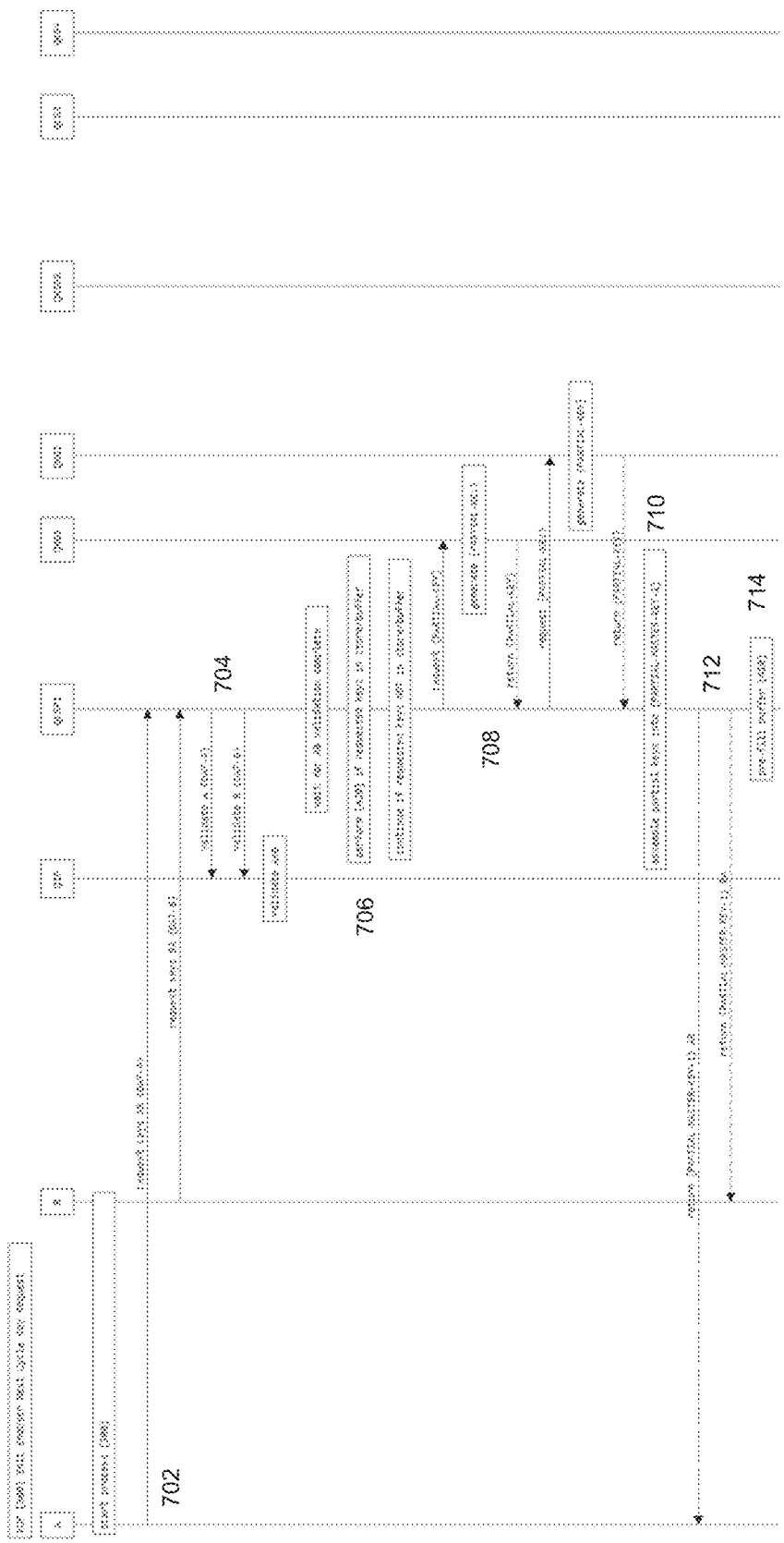
FIGS. 7A and 7B depict an initial end-user next cycle key request according to an embodiment of the invention.
Figure 7B:
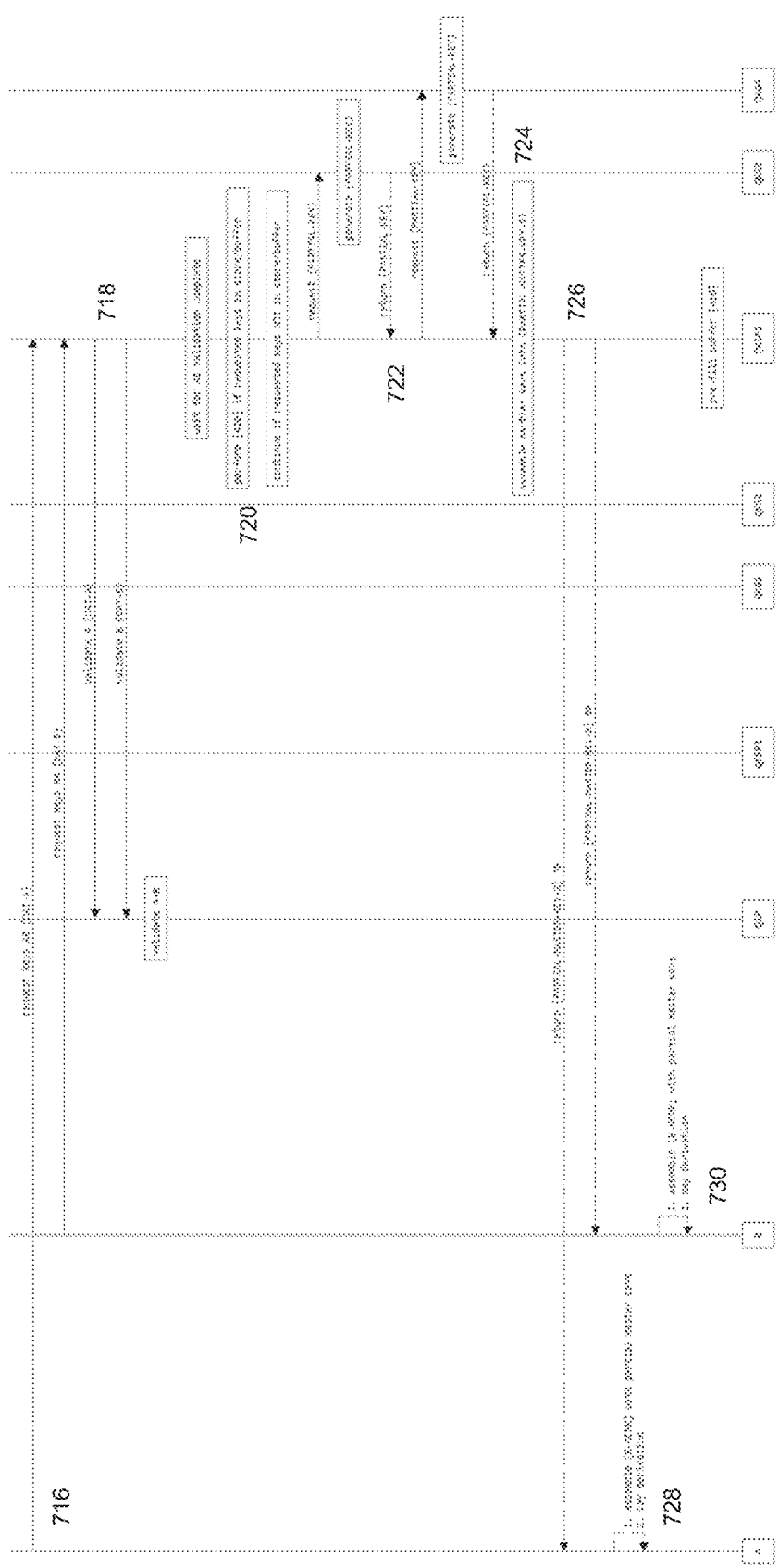

After successful establishment of a shared consensus between terminal A and terminal B, a so-called Init End-User Next Cycle Key Request protocol (step 214) may be executed in which end-user master keys may be determined that are used by terminals A and terminals B for establishing a communication channel between them. An exemplary example of this protocol is described with reference to FIG. 7A and FIG. 7B.

As shown in these figures, the process may start by both terminal A and B sending a key request for an end-user master key to a first QKSP using OAT-A and OAT-B respectively. Both requests may comprise key information associated with the requested end-user master key so that the first QKSP knows which key parts it should use to determine the requested end-user master key. The terminals may derive the key information on the basis of the shared consensus parameters.

After the key requests of terminal A and B have been validated by the QIP on the basis of tokens OAT-A and OAT-B, then the first QKSP may determine the requested end-user master key based on the key information. The process of determining this master key may be similar to the determining of the system master keys as described above in detail with reference to FIGS. 5A and 5B.

Thus, based on the key information in the key requests of terminals A and B, the first QKSP may first check if it may determine a first partial master key (solely) based on key parts in the buffer. If this is the case, the first QKSP may check—based on the key information—if the required key parts are available in the buffer. If this is the case, the first QKSP may determine the first partial master key based on the required key parts and transmit the first partial master key to terminal A and B. Additionally, the first QKSP may trigger transmission of one or more key request to one or more key generators, e.g. a first key generator QKG1 and a second key generator QKG2, to refill the buffer of the first QKSP.

Alternatively, if all or a part of the required key parts are not available in the buffer, the first QKSP may send one or more key requests to one or more key generators, e.g. quantum key generators and/or classical key generators, to generate the missing key parts on-demand. If on-demands key parts are not immediately available, then the one or more key requests may be scheduled with high priority by the scheduler of the first QKSP to fill the buffer with key parts that are necessary to determine the requested first partial master key for terminal A and B as soon as possible.

If the key generators are available for on-demand key generation, the first QKSP may transmit one or more key requests to one or more key generators, e.g. a first and a second key request to a first key generator QKG1 and a second key generator QKG2 respectively, which may generate the requested key parts and transmit the key parts to the first QKSP. The first QKSP may then construct the first partial master key and send this partial master key to terminal A and terminal B.

Based on the same process as described above, terminals A and B may transmit key requests comprising key information to a second QKSP to generate a second partial master key. After terminal A and terminal B have received the second partial key, both terminals may determine an end-user master key (End-User Next Cycle Master Key E-NCMK) based on the first and second partial master keys and a key derivation scheme known from the shared consensus parameters. Based on the end-user master key terminal A and B may derive keys for setting up a secure communication channel between terminal A and B in the second phase of the key distribution scheme of FIG. 2.

Thus, from the above, it follows that the onboarding process involves authentication of the terminals to the core network elements (QIP, QKSP, QLSP) and the generation of master keys that are needed to set up a secure channel between terminals, wherein the master keys are determined on the basis of different key parts that are generated by a plurality of key generators, including quantum key generators, selected from a set of key generators which are managed by different quantum key service provides. The key parts may be a combination from key parts generated by classical key generators and key parts generated by quantum key generators. This way, master keys can be generated which are at least partially based on keys generated by quantum key generators.

Figure 8:
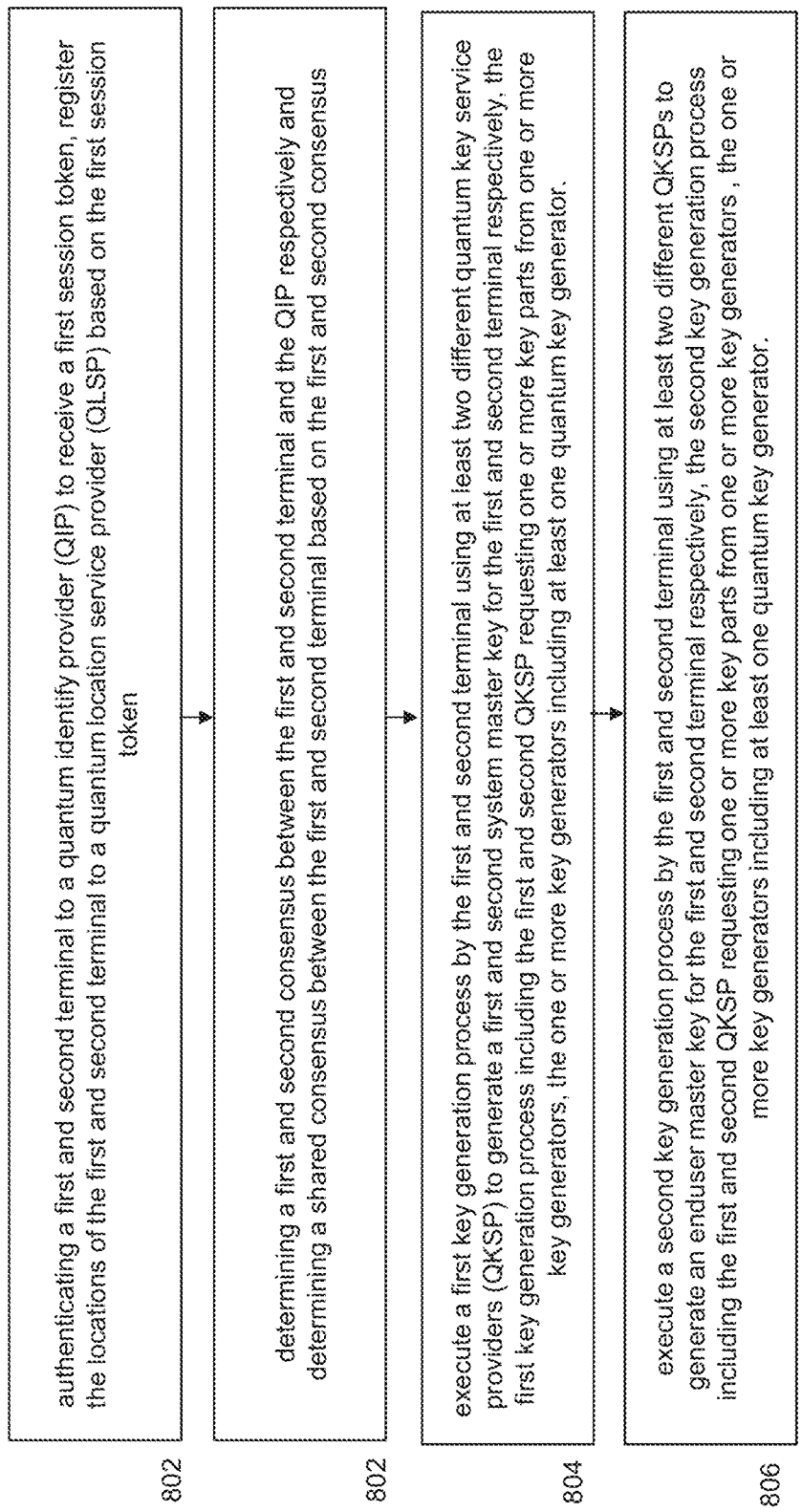
FIG. 8 depicts a general process flow of an orchestrated key distribution scheme according to an embodiment of the invention.

FIG. 8 provides a schematic of the onboarding process according to an embodiment of the invention. As shown in the figure, the process may involve the steps of Authenticating a first terminal, terminal A, and a second terminal, terminal B to a quantum identify provider (QIP) to receive a first session token, registering the locations of the first terminal and second terminal to a quantum location service provider (QLSP) based on the first session token (step 802). Thereafter, a first and second consensus between the first terminal and the second terminal and the QIP respectively may be determined. Further, a shared consensus between the first and second terminal may be determined based on the first and second consensus parameters. This shared consensus includes the set of security parameter that the terminals use when setting up the communication channel (step 804). A first key generation process by the first and second terminal with at least two different quantum key service providers (QKSPs) may be executed to generate a first and second system master key for the first and second terminal respectively. During the execution of this first key generation process, a first QKSP and second QKSP may request one or more key parts from one or more quantum key generators (step 806). Further, a second key generation process by the first and second terminal may be executed with at least two different QKSPs to generate a user master key for terminal A and B, the second key generation process including the first and second QKSP requesting one or more key parts from one or more quantum key generators (step 808).

After onboarding, consensus and an initial next cycle key generation of the system master keys and the end-user master key, a communication cycle for setting up a secure communication channel between terminal A and B, wherein secure data exchange between the terminals may be realized based on a symmetric encryption key, referred to as a direct encryption key (DEK). As will be described hereunder in more detail, successful set up of the communication channel requires both terminal A and B to determine a set of keys, including a QIP authentication key (OAK), a direct authentication key (DAK) as well as a direct encryption key (DEK). These keys are derived from master keys which—in turn—are constructed based on key parts which are generated by different quantum key generators in the system. The whole process is orchestrated by the QIP, the QLSP and the QKSP, which form the core of the key distribution network.

Figures 9, 10:
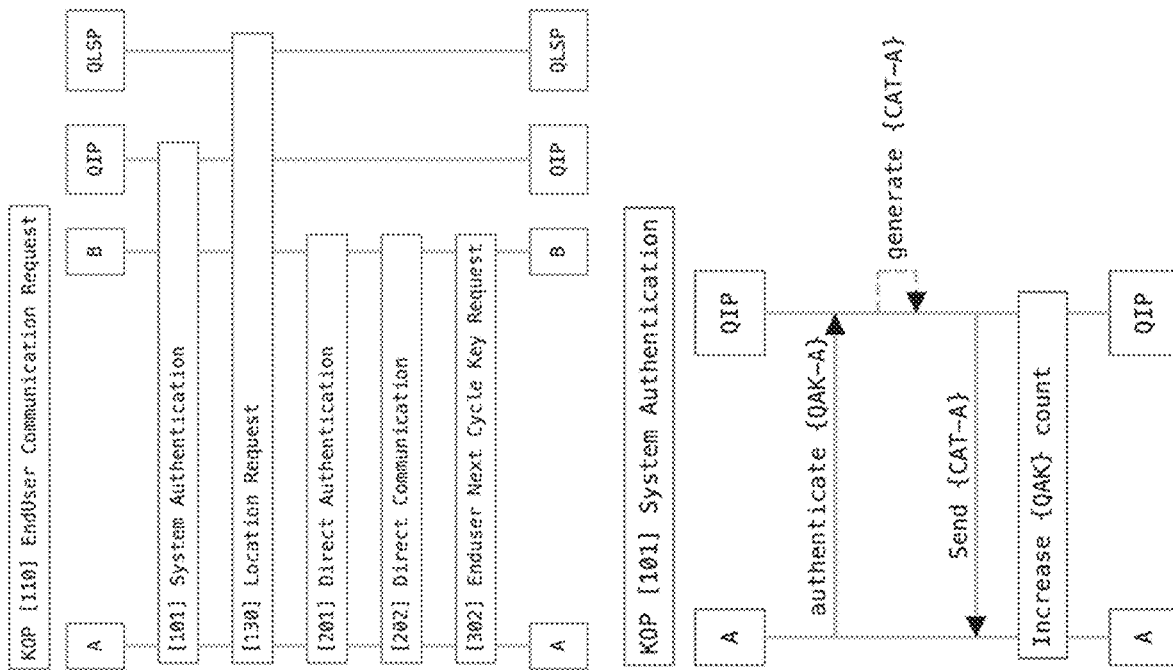
FIG. 9 depicts an end-user communication request protocol according to an embodiment of the invention.
FIG. 10 depicts a system authentication process according to an embodiment of the invention.

To that end, terminal A set up a communication channel with terminal B (step 216). This process is depicted in more detail in FIGS. 9 and 10. As shown in these figures, the process may include authentication of terminal A to the QIP followed by a location request to the QLSP. FIG. 10 illustrates that authentication of terminal A to the QIP may be based on the first QIP authentication key OAK-A, which is sent in an authentication request to the QIP. In response, the QIP may generate a communication authentication token CAT-A for terminal A, which is sent in a response message to terminal A. This token will be valid for the time the communication phase is active. Further, after the use of the OAK-A, the key is increased based on a counter, which is implemented on the terminal side and the QIP. This way, spoofing attacks between the terminal and the QIP can be reduced.

Figure 11:
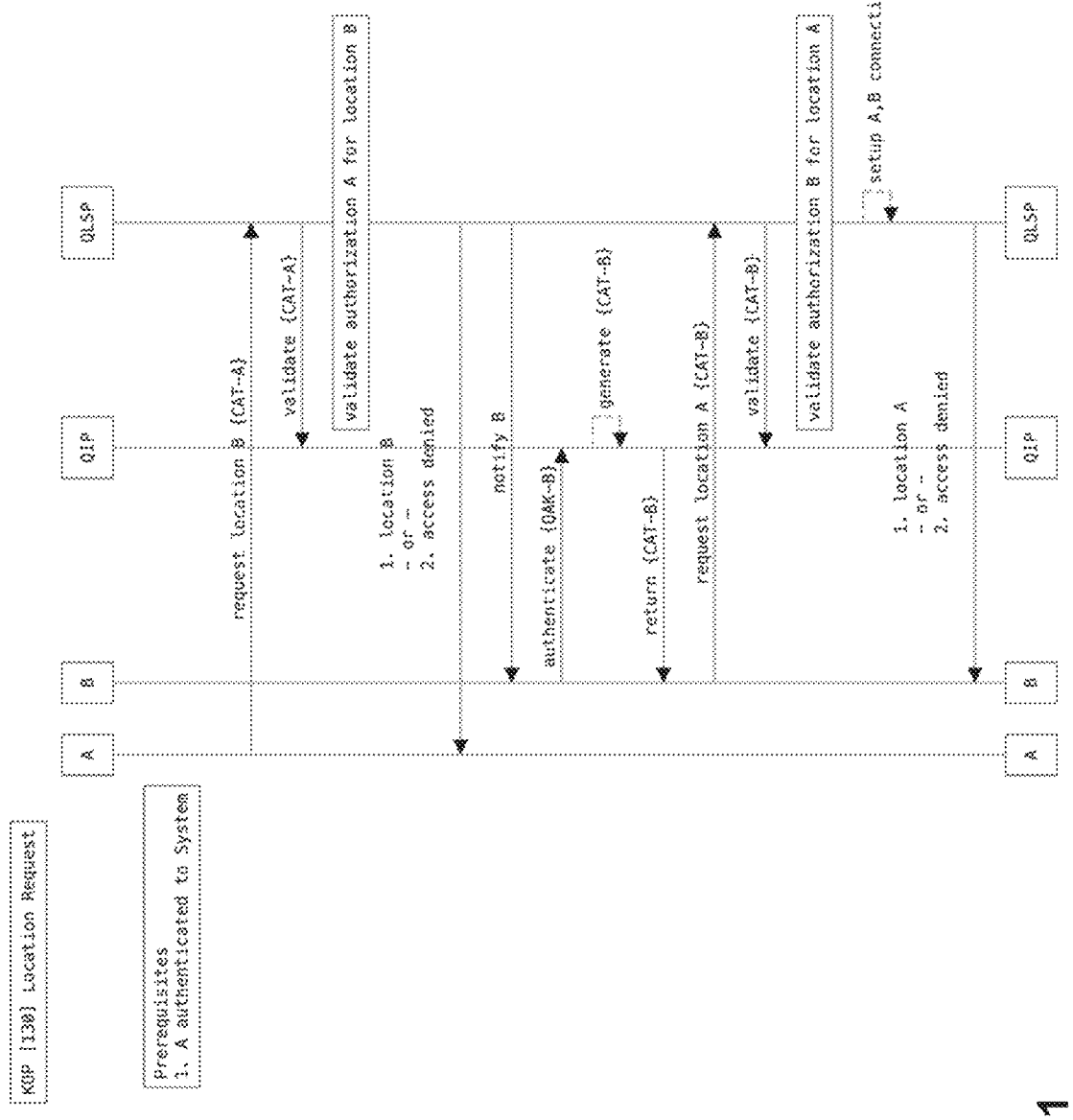
FIG. 11 depicts a location process according to an embodiment of the invention.

After authentication, a location request protocol is executed in which terminal A and B are provided with each other's locations (or at least check if the location of terminals are still correct). An example of this protocol is depicted in FIG. 11. As shown in this figure, first terminal A may transmit a location request comprising its communication token CAT-A to the QLSP, which may use the token to validate the request via the QIP. In case of successful validation, the location of terminal B may be transmitted to terminal A by the QLSP, which may also notify terminal B that terminal A has received the location of terminal A. In response, terminal B may use its QIP authentication key OAK-B to authenticate with the QIP, which—in response—may generate a communication authentication token CAT-B, which is transmitted to terminal B. Terminal B may subsequently send a location request for the location of terminal A to the QLSP wherein the request may comprise a token CAT-B. After validation of the token by the QIP, the QLSP may transmit the location of terminal A to terminal B.

Figures 12, 13:
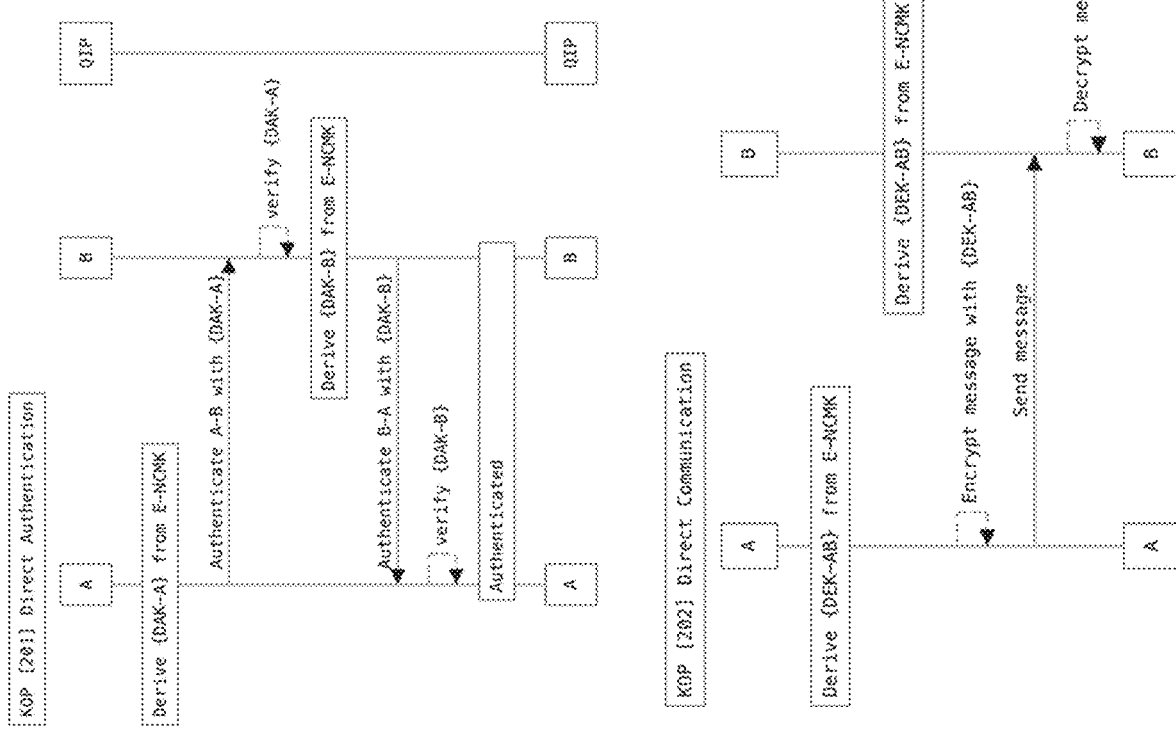
FIG. 12 depicts a direct authentication process according to an embodiment of the invention.
FIG. 13 depicts a direct communication process according to an embodiment of the invention.

The above-described authentication of the terminal B to the QIP and the subsequent location request of terminal B to the QLSP are depicted as steps 218 and 220 in FIG. 2. Next, terminal A and B may authenticate each other and set up a direct secure communication channel (steps 222 and 224 of FIG. 2 respectively). A more detailed scheme of the direct authentication process is depicted in FIG. 12. Terminal A may determine a direct authentication key DAK-A based on the end-user master key E-NCMK which is shared by terminal A and B. The DAK-A may be determined based on the key derivation scheme as defined by the security parameters which are shared between terminal A and B based on the consensus protocol of FIG. 4. Thereafter, terminal A may transmit an authentication request comprising the DAK-A to terminal B, which may check the DAK-A based on the end-user master key E-NCMK and the key derivation scheme.

Terminal B may determine a direct authentication key DAK-B based on the end-user master key E-NCMK which is shared by terminal A and B. The DAK-B may be determined based on the key derivation scheme as defined by the security parameters which are shared between terminal A and B based on the consensus protocol of FIG. 4. Thereafter, terminal B may transmit an authentication request comprising the DAK-B to terminal A, which may check the DAK-A based on the end-user master key E-NCMK and the key derivation scheme. When successfully executed, terminal A and B have authenticated each other so that the terminals may proceed to determine an encryption key, the so-called direct encryption key (DEK-AB), for the direct communication between terminal A and B (step 224 of FIG. 2).

A more detailed scheme of the direct communication process is depicted in FIG. 13. This process may start with terminal A and B deriving the direct decryption key DEK-AB from the end-user master key E-NCMK using the key derivation scheme that is shared between terminal A and B. Thereafter, terminal A may use the DEK-AB to encrypt one or more data messages and transmit the one or more messages to terminal B, which may decrypt the message based on the DEK-AB.

The use of the communication channel may be limited in time and/or based on the amount of data and/or requests that transmitted over the communication channel. During the data exchange, the terminals monitor when the communication channel should be terminated. The terminals may determine termination of the communication channel based on threshold information which is part of the consensus parameters. If one or more of these thresholds have been reached, then the data communication cycle will be closed by the terminals.

If more data needs to be transmitted over the secure communication channel, terminal A and B may send a further End-User Next Cycle Key Request to a first QKSP (step 226 of FIG. 2) to generate a new end-user master key (E-NCMK) for a further communication cycle. Further, terminal A and B may both initiate a System Next Cycle Key request (steps 228 and 230) to generate new system master keys (S-NCMKs) for terminal A and B and the QIP, which may be used for determining new authentication keys, such as the QIP authentication keys QAK-A and OAK-B respectively, which allow terminal A and B to authenticate to the QIP and the QLSP in the further communication cycle.

Figure 14A:
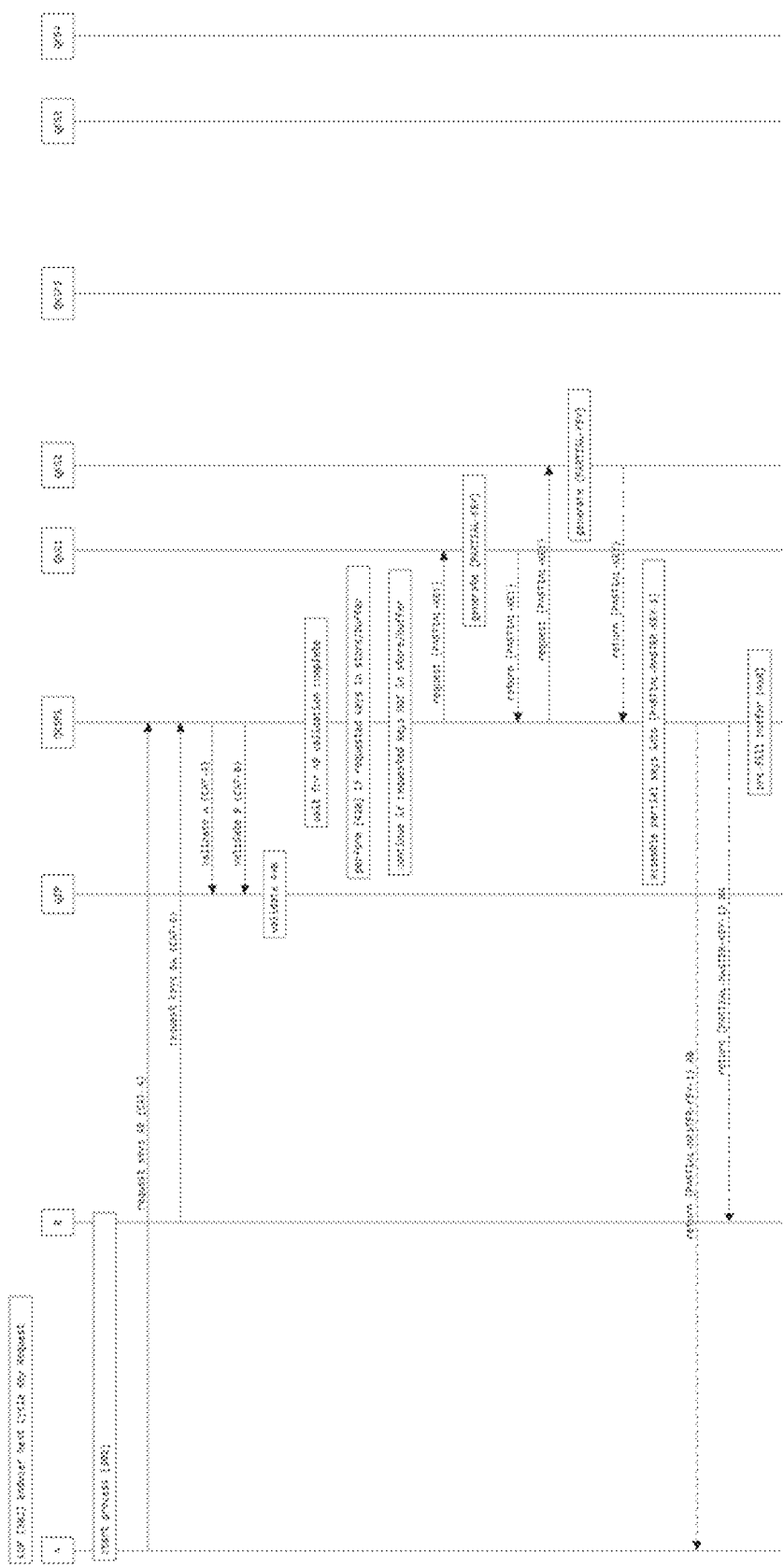
FIGS. 14A and 14B depict an end-user next cycle key request according to an embodiment of the invention.
Figure 14B:
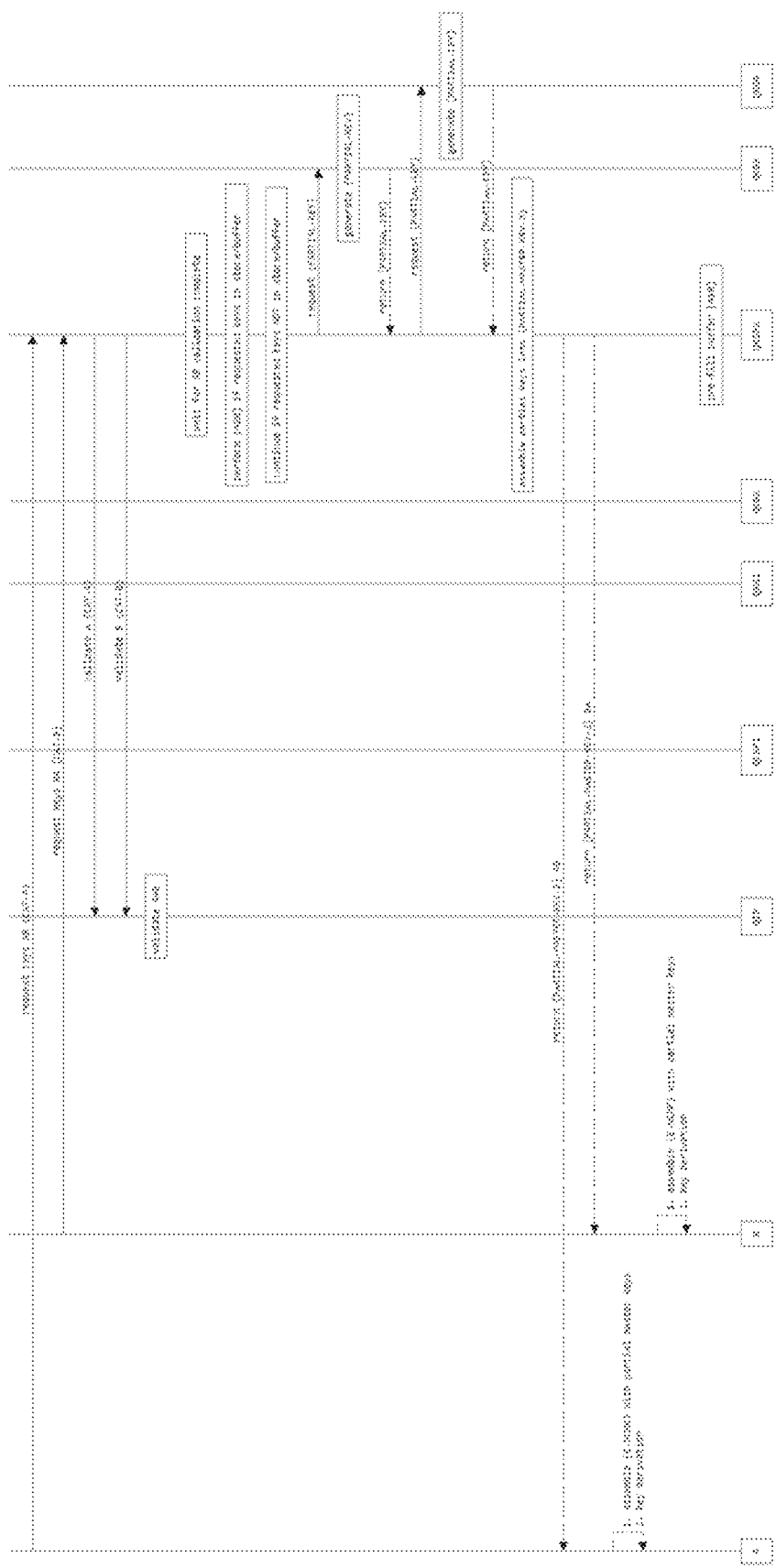

A more detailed scheme of the End-User Next Cycle Key Request is depicted in FIGS. 14A and 14B. As shown in these figures, both terminal A and B may send a key request to the first QKSP wherein the key request may comprise authentication tokens CAT-A and CAT-B and comprising key information. After validation of the tokens, first and second partial master keys may be determined by a first and second QKSP respectively using a protocol as described with reference to FIG. 7. Based on the first and second partial master key, terminal A and B may determine a new end-user master key E-NCMK that is used in the next data communication cycle.

Figure 15A:
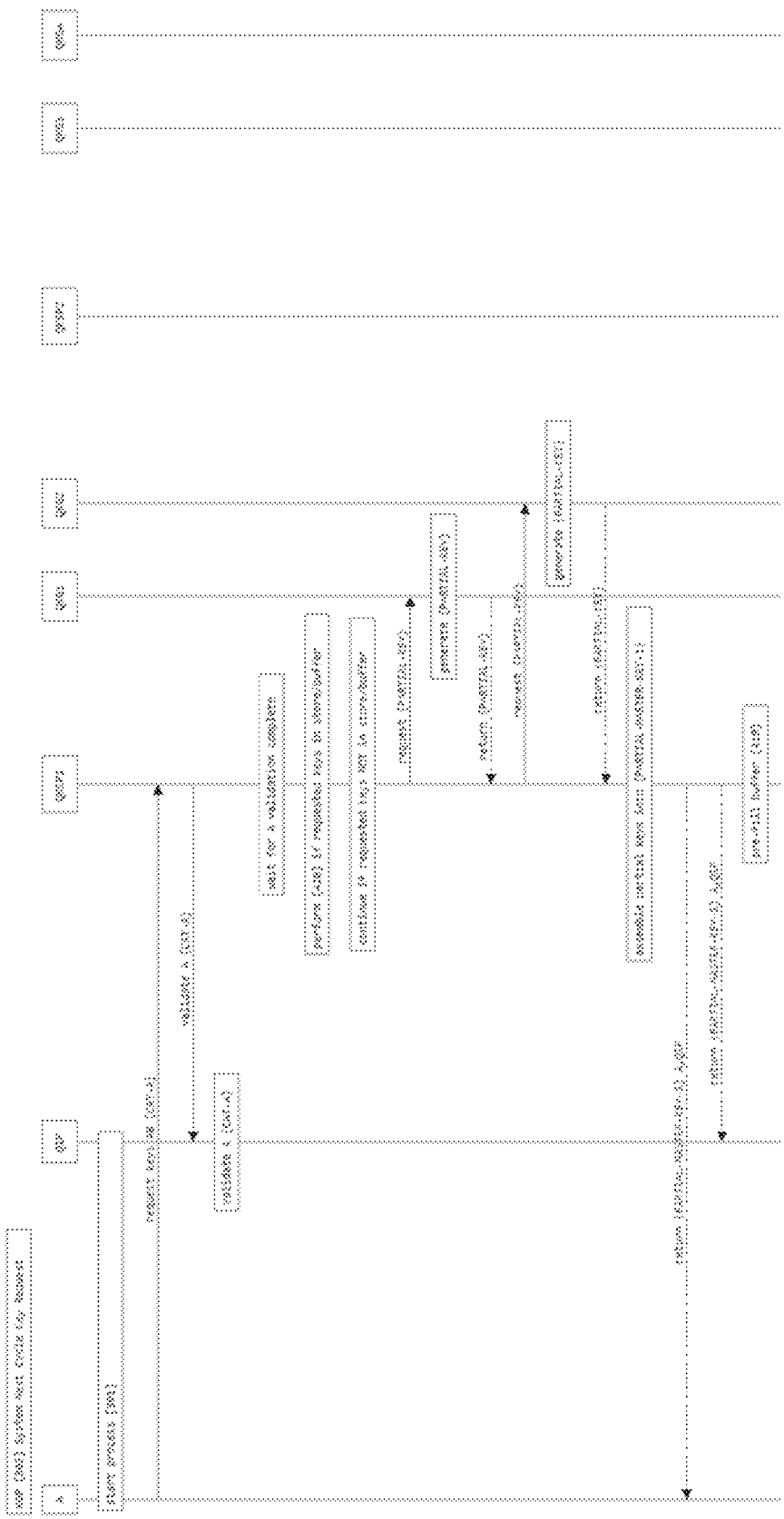
FIGS. 15A and 15B depict a system next cycle key request according to an embodiment of the invention.
Figure 15B:
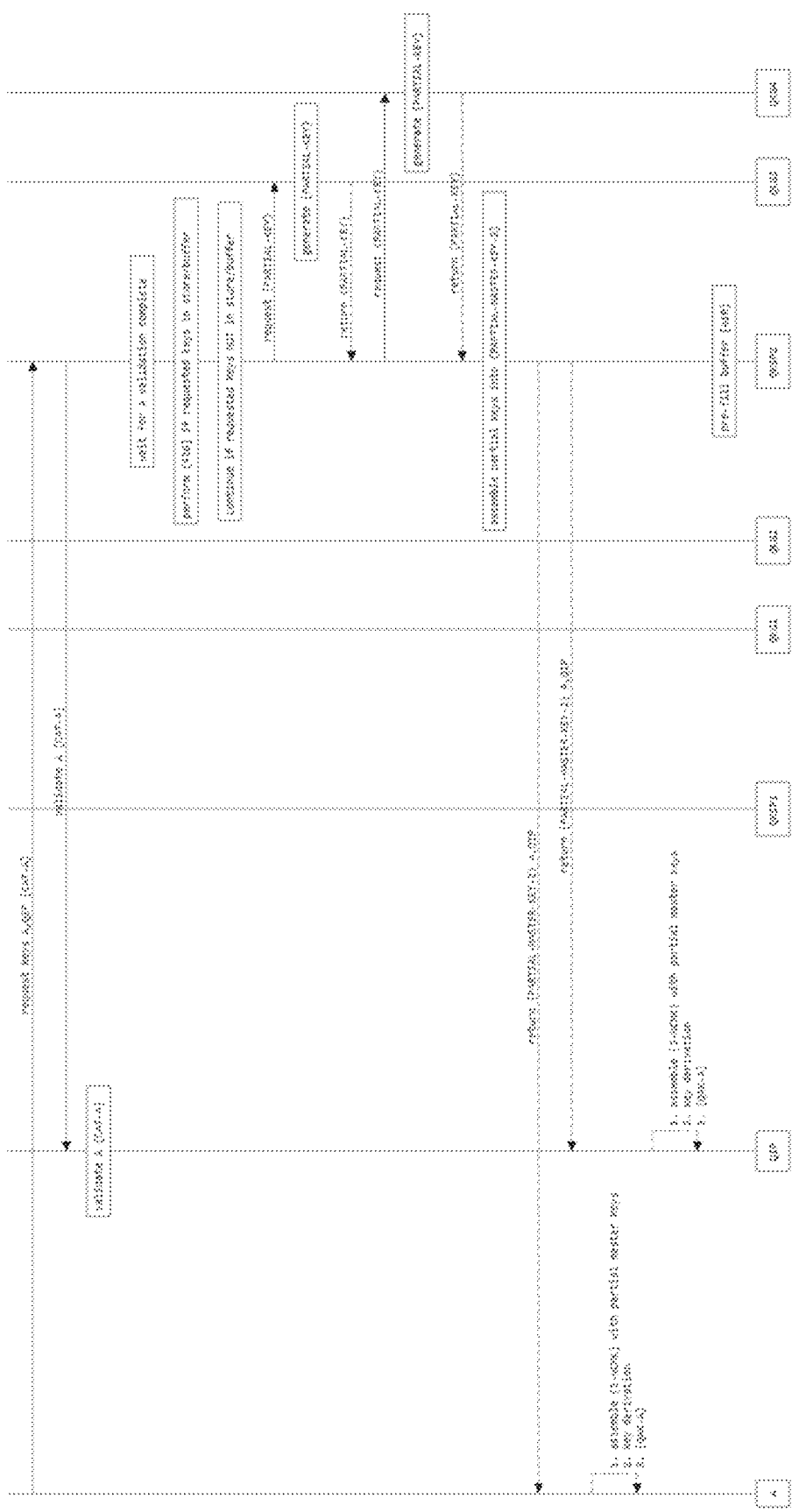
Figure 16:
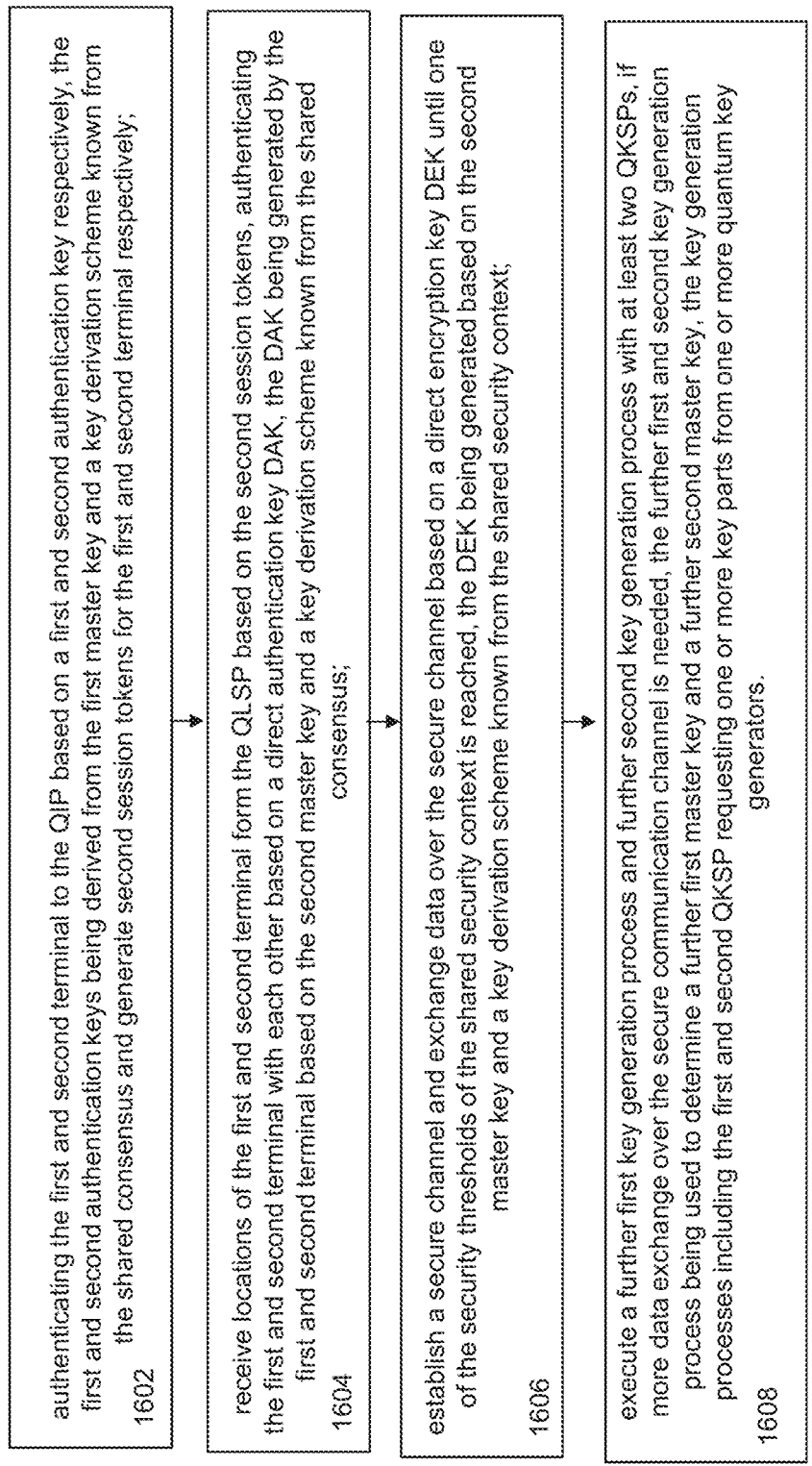
FIG. 16 depicts a general process flow of an orchestrated key distribution scheme according to an embodiment of the invention.

A more detailed scheme of the System Next Cycle Key request for terminal A is depicted in FIGS. 15A and 15B. As shown in these figures, terminal A may send a key request to a first QKSP to generate a first partial master key for terminal A and the QIP. Similarly, terminal A may send a key request to a second QKSP to generate a second partial master key for terminal B and the QIP. Based on the first and second partial master key terminal A and the QIP may determine a first system master key. The first and second partial master key may be generated by the first and second QKSP respectively based the protocol that is described in detail with reference to FIGS. 5A and 5B. The same process may be used to provide terminal B and the QIP with a new second system master key S-NCMK, FIG. 16 depicts a general process flow of an orchestrated key distribution scheme according to an embodiment of the invention. As shown in this figure, the process may include authenticating the first and second terminal to the QIP based on a first and second authentication key respectively, the first and second authentication keys being derived from the first master key and a key derivation scheme known from the shared security context and generate second session tokens for the first and second terminal respectively (step 1602). Thereafter, locations of the first and second terminal may be received from the QLSP based on the second session tokens. Further, the first and second terminals may authenticate each other based on a direct authentication key DAK, wherein the DAK may be generated by the first and second terminal based on the second master key and a key derivation scheme known from the shared security context (step 1604). Further, a secure channel may be established, and data may be exchanged over the secure channel based on a direct encryption key DEK, until one of the security thresholds of the shared security context is reached, wherein the DEK may be generated based on the second master key and a key derivation scheme known from the shared security context (step 1606). Finally, a further execute a further first key generation process and further second key generation process with at least two QKSPs, if more data exchange over the secure communication channel is needed, the further first and second key generation process being used to determine a further first master key and a further second master key, the key generation processes including the first and second QKSP requesting one or more key parts from one or more quantum key generators (step 1608).

Figure 18:
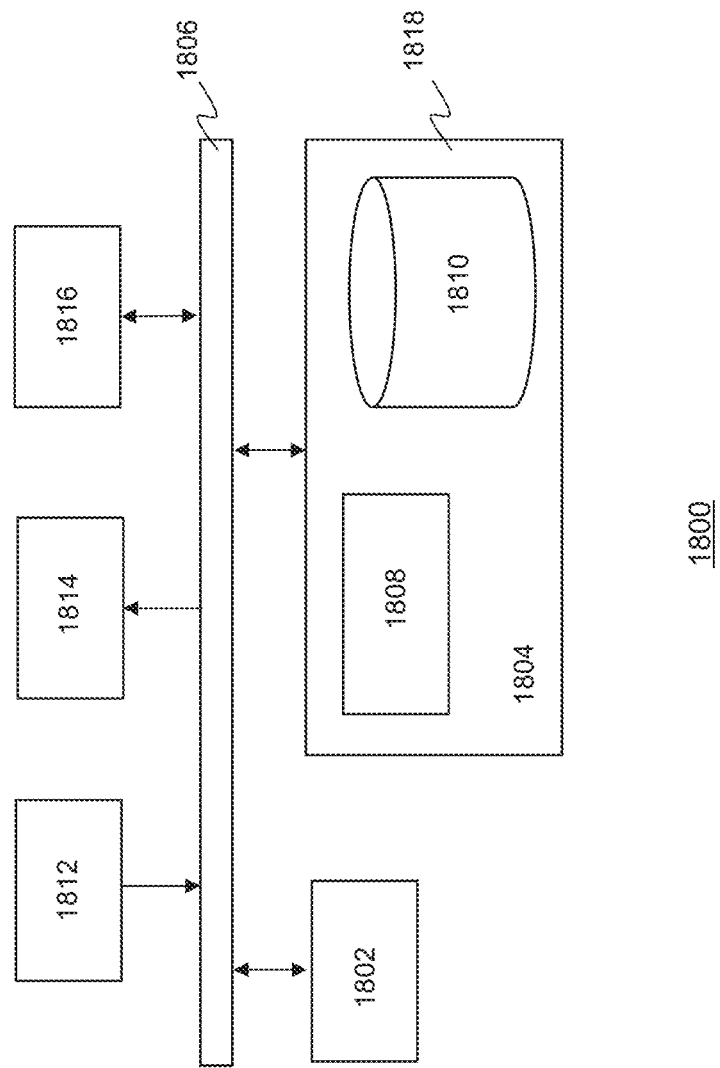
FIG. 18 depicts a block diagram illustrating an exemplary data processing system that may be used with embodiments described in this disclosure.

FIG. 18 is a block diagram illustrating an exemplary data processing system that may be used in as described in this disclosure. Data processing system 1800 may include at least one processor 1802 coupled to memory elements 1804 through a system bus 1806. As such, the data processing system may store program code within memory elements 1804. Further, processor 1802 may execute the program code accessed from memory elements 1804 via system bus 1806. In one aspect, data processing system may be implemented as a computer that is suitable for storing and/or executing program code. It should be appreciated, however, that data processing system 1800 may be implemented in the form of any system including a processor and memory that is capable of performing the functions described within this specification.

Memory elements 1804 may include one or more physical memory devices such as, for example, local memory 1808 and one or more bulk storage devices 1810. Local memory may refer to random access memory or other non-persistent memory device(s) generally used during actual execution of the program code. A bulk storage device may be implemented as a hard drive or other persistent data storage device. The processing system 1800 may also include one or more cache memories (not shown) that provide temporary storage of at least some program code in order to reduce the number of times program code must be retrieved from bulk storage device 1810 during execution.

Input/output (I/O) devices depicted as input device 1812 and output device 1814 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1816 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1800.

As pictured in FIG. 18, memory elements 1804 may store an application 1818. It should be appreciated that data processing system 1800 may further execute an operating system (not shown) that can facilitate execution of the application. Application, being implemented in the form of executable program code, can be executed by data processing system 1800, e.g., by processor 1802. Responsive to executing application, data processing system may be configured to perform one or more operations to be described herein in further detail.

In one aspect, for example, data processing system 1800 may represent a client data processing system. In that case, application 1818 may represent a client application that, when executed, configures data processing system 1800 to perform the various functions described herein with reference to a "client". Examples of a client can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for key distribution comprising:
   authenticating a first and second terminal to a quantum identify provider, QIP,
   and registering locations of the first and second terminal to a quantum location service provider, QLSP;
      determining a first and second system security consensus between the first and second terminal and the QIP respectively, the first and second system security consensus identifying at least a first and second quantum key service provider (QKSP);
      executing on a basis first and second system security consensus, a first key generation process for generating a first system master key and second system master key for the first and second terminal respectively, wherein the first and second system master key are determined based on first key parts received by the first QKSP from first key generators and second key parts received by the second QKSP from second key generators, the first and second key generators including one or more quantum key generators;
      determining a shared security consensus between the first and second terminal, the shared security consensus identifying at least a third and fourth QKSP; and,
      executing on a basis of the shared security consensus a second key generation process for generating an end-user master key for first terminal and second terminal respectively, wherein the end-user master key is determined based on third key parts received by the third QKSP from third key generators and based on fourth key parts received by the fourth QKSP from fourth key generators, the third and fourth key generators including one or more quantum key generators.

2. The method according to claim 1 wherein executing the first key generation process further comprises:
   transmitting, by the first terminal, a first key request for a first partial master key to the first QKSP, the first key request including first key information for informing the first QKSP how the first partial master key should be determined on a basis of the first key parts;
   determining, by the first QKSP, if the first key parts are available in a first buffer of the first QKSP and if the first key parts are not available, the first QKSP requesting the first key parts from the first key generators; and, determining, by the first QKSP, the first partial master key based on the first key parts, and transmitting the first partial master key to the first terminal.

3. The method according to claim 2 wherein if the first key parts are available in the first buffer, determining, by the first QKSP, the first partial master key based on the first key parts stored in the buffer, and transmitting the first partial master key to the first terminal; and the first QKSP removing the first key parts from the first buffer and requesting one or more first key parts from one or more first key generators to refill the first buffer.

4. The method according to claim 2 wherein if the first key parts are available in the first buffer and, if the first key information allows the determination of the first partial master key on a basis of first key parts stored in the buffer, determining, by the first QKSP, the first partial master key based on the first key parts stored in the buffer, and transmitting the first partial master key to the first terminal; and the first QKSP removing the first key parts from the first buffer and requesting one or more first key parts from one or more first key generators to refill the first buffer.

5. The method according to claim 1 wherein executing a the first key generation process further comprises:
transmitting, by the first terminal, a second key request for a second partial master key to the second QKSP, the second key request including second key information for informing the second QKSP how the second partial master key should be determined on a basis of the second key parts;
determining, by the second QKSP, if the second key parts are available in a second buffer of the second QKSP and if the second key parts are not available, the second QKSP requesting the second key parts from the second key generators; and,
determining, by the second QKSP, the second partial master key based on the second key parts, and transmitting the second partial master key to the first terminal.

6. The method according to claim 1 further comprising: authenticating the first and second terminal to the QIP based on a first and second
authentication key respectively, the first and second authentication keys being derived from the first and second system master key and a key derivation scheme identified in the first and second system security consensus respectively;
generating by the QIP second session tokens for the first and second terminal
respectively;
receiving by the first terminal a location of the second terminal and/or receiving
by the second terminal a location of the first terminal from the QLSP based on the second session tokens;
authenticating the first and second terminal with each other based on the locations and based on a direct authentication key DAK, the DAK being generated by the first and second terminal based on the end-user master key and a key derivation scheme identified in the shared security consensus; and
establishing a secure channel between the first and second terminal and exchange data over the secure channel based on a direct encryption key DEK until a security threshold of the shared security consensus is reached, the DEK being generated based on the end-user master key and a key derivation scheme identified in the shared security consensus.

7. The method according to claim 6 further comprising: executing a further first key generation process and further second key generation
process using at least two different QKSPs, if more data exchange over the secure channel is needed, the further first and second key generation process being used to determine a further first master key and a further second master key, the further first and second key generation processes including the first and second QKSP requesting respective key parts from respective key generators.

8. The method according to claim 1 wherein the first system master key and ma are used by the first and second terminal respectively to start execution of a further first key generation process and further second key generation process.

9. The method according to claim 1 wherein when authenticating the first and second terminal to the QIP, the first and second terminal receive first session tokens and wherein the locations of the first and second terminal are registered to the QLSP, based on validating the first session tokens by the QIP.

10. The method according to claim 1 wherein the first system security consensus, the second system security consensus and the shared security consensus include consensus information comprising at least one of:
information on a key length of a partial master key that the first and/or second QKSP constructs based on key parts, a number of key parts that the first and/or second QKSP use for constructing a first and/or second partial master key, a length of a key part generated by a key generator, a number of quantum key generators, a number of new key parts that is used to construct a partial master key, information whether or not a partial master key is determined based on key parts that are stored in a buffer of a QKSP, information associated with one or more key derivation protocols that is used by a terminal to derive different keys from a master key, information associated with one or more authentication protocols that is used for authenticating terminals with each other and/or with other network elements such as the QIP, QKSP or QLSP, information about protocols and/or algorithms that are used by the QIP to authenticate, sign and/or validate terminals or requests of terminals, threshold information for determining when a secure communication channel has ended such threshold information includes maximum amount of data traffic, number of messages and/or transactions per cycle and/or maximum time/duration per cycle.

11. A key distribution system comprising;
a plurality of communicatively connected nodes, the nodes including a quantum identity provider, QIP; a quantum location service provider, QLSP; a plurality of quantum key service providers, QKSP, wherein each QKSP is connected to a plurality of key generators, the plurality of key generators including one or more quantum key generators; and, at least a first and second terminal, wherein the nodes include hardware processors configured to perform executable operations, wherein the executable operations comprise:
authenticating a first and second terminal to the QIP and registering locations of the first and second terminal to the QLSP;
determining a first and second system security consensus between the first and second terminal and the QIP respectively, the first and second system security consensus identifying at least a first and second QKSP;

executing on a basis of the first and second system security consensus, a first key generation process for generating a first system master key and second system master key for the first and second terminal respectively, wherein the first and second system master key are determined based on first key parts received by the first QKSP from first key generators and second key parts received by the second QKSP from second key generators, the first and second key generators including one or more quantum key generators;

determining a shared security consensus between the first and second terminal, the shared security consensus identifying at least a third and fourth QKSP;

and, executing on the basis of the shared security consensus a second key generation process for generating an end-user master key for first terminal and second terminal respectively, wherein the end-user master key is determined based on third key parts received by the third QKSP from third key generators and based on fourth key parts received by the fourth QKSP from fourth key generators, the third and fourth key generators including one or more quantum key generators.

12. The system according to claim 11, wherein executing the first key generation process further comprises:

transmitting, by the first terminal, a first key request for a first partial master key to the first QKSP, the first key request including first key information for informing the first QKSP how the first partial master key should be determined on the basis of the first key parts;

determining, by the first QKSP, if the first key parts are available in a first buffer of the first QKSP and if the first key parts are not available, the first QKSP requesting the first key parts from the first key generators; and, determining, by the first QKSP, the first partial master key based on the first key parts, and transmitting the first partial master key to the first terminal.

13. The system according to claim 12 wherein if the first key parts are available in the first buffer determining, by the first QKSP, the first partial master key based on the first key parts stored in the buffer, and transmitting the first partial master key to the first terminal; and the first QKSP removing the first key parts from the buffer and requesting one or more first key parts from one or more first key generators to refill the buffer.

14. The system according to claim 12 wherein if the first key parts are available in the first buffer and, if the first key information allows the determination of the first partial master key on the basis of first key parts stored in the buffer, determining, by the first QKSP, the first partial master key based on the first key parts stored in the buffer, and transmitting the first partial master key to the first terminal; and the first QKSP removing the first key parts from the buffer and requesting one or more first key parts from one or more first key generators to refill the buffer.

15. The system according to claim 11 wherein executing the first key generation process further comprises:

transmitting, by the first terminal, a second key request for a second partial master key to the second QKSP, the second key request including second key information for informing the second QKSP how the second partial master key should be determined on the basis of the second key parts;

determining, by the second QKSP, if the second key parts are available in a second buffer of the second QKSP and if the second key parts are not available, the second QKSP requesting the second key parts from the second key generators; and, determining, by the second QKSP, the second partial master key based on the second key parts, and transmitting the second partial master key to the first terminal.

16. The system according to claim 11 further comprising: authenticating the first and second terminal to the QIP based on a first and second authentication key respectively, the first and second authentication keys being derived from the first system master key and a key derivation scheme identified in the shared security consensus;

generating by the QIP second session tokens for the first and second terminal respectively;

receiving locations of the first and second terminal from the QLSP based on the second session tokens;

authenticating the first and second terminal with each other based the locations and on a direct authentication key DAK, the DAK being generated by the first and second terminal based on the second system master key and a key derivation scheme identified in the shared security consensus; and establishing a secure channel between the first and second terminal and exchange data over the secure channel based on a direct encryption key DEK until a security threshold of the shared security consensus is reached, the DEK being generated based on the second system master key and a key derivation scheme known from the shared security consensus.

17. The system according to claim 11 wherein the first system master key and second system master key are used by the first and second terminal respectively to start the execution of the second key generation process.

18. The system according to claim 11 wherein when authenticating the first and second terminal to the QIP, the first and second terminal receive first session tokens and wherein the locations of the first and second terminal are registered to the QLSP, based on validating the first session tokens by the QIP.

19. A non-transitory suite of computer program products comprising software code portions having instructions configured for a plurality of communicatively connected network nodes, wherein the nodes include a first and second terminal, a quantum id entity provider, QIP, a quantum location service provider, QLSP, a plurality of QKSPs, wherein each Quantum Key Service Provider, QKSP is connected to a plurality of key generators, and wherein the instructions when executed by one or mon processors perform a method comprising:

authenticating the first and second terminal to the QIP and registering locations of the first and second terminal to the QLSP;

determining a first and second system security consensus between the first and second terminal and the QIP respectively, the first and second system security consensus identifying at least a first and second quantum key service provider (QKSP);

executing on a basis first and second system security consensus, a first key generation process for generating a first system master key and second system master key for the first and second term respectively, wherein the first and second system master key are determined based on first key parts received by the first QKSP from first key generators and second key parts receive second QKSP from second key generators, the first and second key generators including one or more quantum key generators;

determining a shared security consensus between the first and second terminal, the shared security consensus identifying at least a third and fourth quantum location service provider QKSP; and, executing on a basis of the shared security consensus a second key generation process for generating an end-user master key for first terminal and second terminal respectively, wherein the end-user master key is determined based on third key parts received by the third QKSP from third key generators and based on fourth key parts received by the fourth QKSP from fourth key generators, the third and fourth key generators including one or more quantum key generators.

* * * * *